US009354883B2

(12) United States Patent
Bradbury et al.

(10) Patent No.: US 9,354,883 B2
(45) Date of Patent: May 31, 2016

(54) DYNAMIC ENABLEMENT OF MULTITHREADING

(71) Applicant: International Business Machines Corporation, Armonk, NY (US)

(72) Inventors: Jonathan D. Bradbury, Poughkeepsie, NY (US); Fadi Y. Busaba, Poughkeepsie, NY (US); Mark S. Farrell, Pleasant Valley, NY (US); Charles W. Gainey, Jr., Poughkeepsie, NY (US); Dan F. Greiner, San Jose, CA (US); Lisa Cranton Heller, Rhinebeck, NY (US); Christian Jacobi, Schoenaich (DE); Jeffrey P. Kubala, Poughquag, NY (US); Damian L. Osisek, Vestal, NY (US); Donald W. Schmidt, Stone Ridge, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 14/226,881

(22) Filed: Mar. 27, 2014

(65) Prior Publication Data

US 2015/0277918 A1 Oct. 1, 2015

(51) Int. Cl.
*G06F 9/30* (2006.01)
*G06F 9/40* (2006.01)
(Continued)

(52) U.S. Cl.
CPC .......... *G06F 9/30145* (2013.01); *G06F 9/3851* (2013.01); *G06F 9/50* (2013.01)

(58) Field of Classification Search
None
See application file for complete search history.

(56) References Cited

U.S. PATENT DOCUMENTS

| 5,684,993 A | 11/1997 | Willman |
| 6,256,730 B1 | 7/2001 | DeCarmo |

(Continued)

FOREIGN PATENT DOCUMENTS

| CN | 101042640 | 9/2007 |
| CN | 101216725 | 4/2011 |

(Continued)

OTHER PUBLICATIONS

Akkary et al. "A Dynamic Multithreading Processor," Microcomputer Research Labs, Intel Corporation, Nov. 1998, 11 pages.

(Continued)

*Primary Examiner* — Corey S Faherty
(74) *Attorney, Agent, or Firm* — Cantor Colburn LLP; William A. Kinnaman, Jr.

(57) ABSTRACT

Embodiments relate to dynamic enablement of multithreading. According to an aspect, a computer system includes a configuration with a core configurable between a single thread (ST) mode and a multithreading (MT) mode. The ST mode addresses a primary thread, and the MT mode addresses the primary thread and one or more secondary threads on shared resources of the core. The computer system also includes a multithreading facility configured to control the configuration to perform a method. The method includes executing in the primary thread in the ST mode, an MT mode setting instruction. A number of threads requested is obtained from a location specified by the MT mode setting instruction. Based on determining that the number of threads requested indicates multiple threads, the MT mode is enabled to execute the multiple threads including the primary thread and the one or more secondary threads.

13 Claims, 17 Drawing Sheets

(51) Int. Cl.
*G06F 9/38* (2006.01)
*G06F 9/50* (2006.01)

(56) References Cited

U.S. PATENT DOCUMENTS

| | | | |
|---|---|---|---|
| 6,697,935 | B1 | 2/2004 | Borkenhagen et al. |
| 6,757,811 | B1 | 6/2004 | Mukherjee |
| 6,792,525 | B2 | 9/2004 | Mukherjee et al. |
| 6,801,997 | B2 | 10/2004 | Joy et al. |
| 6,954,846 | B2 | 10/2005 | Leibholz et al. |
| 7,073,173 | B1 | 7/2006 | Willman |
| 7,216,223 | B2 | 5/2007 | Michaelis |
| 7,321,965 | B2 | 1/2008 | Kissell |
| 7,363,474 | B2 | 4/2008 | Rodgers et al. |
| 7,418,582 | B1 | 8/2008 | Iacobovici et al. |
| 7,496,915 | B2 | 2/2009 | Armstrong et al. |
| 7,519,796 | B1 | 4/2009 | Golla et al. |
| 7,559,061 | B1 | 7/2009 | Gustafson et al. |
| 7,584,346 | B1 | 9/2009 | Chaudhry et al. |
| 7,698,540 | B2 | 4/2010 | Norton et al. |
| 7,707,578 | B1 | 4/2010 | Zedlewski et al. |
| 7,849,297 | B2 | 12/2010 | Kissell |
| 7,865,702 | B2 | 1/2011 | Suba |
| 7,873,816 | B2 | 1/2011 | Hickey et al. |
| 7,984,275 | B2 | 7/2011 | Farrell et al. |
| 8,024,735 | B2 | 9/2011 | Rudd et al. |
| 8,041,929 | B2 | 10/2011 | Jeter et al. |
| 8,078,840 | B2 | 12/2011 | Banerjee et al. |
| 8,266,620 | B2 | 9/2012 | Kissell |
| 8,275,942 | B2 | 9/2012 | Yigzaw et al. |
| 8,375,390 | B2 | 2/2013 | Inoue et al. |
| 8,381,216 | B2 | 2/2013 | Gowda |
| 8,402,224 | B2 | 3/2013 | Bruening et al. |
| 8,402,464 | B2 | 3/2013 | Dice et al. |
| 8,407,714 | B2 | 3/2013 | Gomyo et al. |
| 8,418,177 | B2 | 4/2013 | Jayamohan |
| 8,447,959 | B2 | 5/2013 | Yoshida |
| 8,489,787 | B2 | 7/2013 | Adar et al. |
| 8,544,006 | B2 | 9/2013 | Bell, Jr. et al. |
| 8,612,978 | B2 | 12/2013 | Damron |
| 8,615,644 | B2 | 12/2013 | Bruce et al. |
| 8,621,458 | B2 | 12/2013 | Traut et al. |
| 8,656,408 | B2 | 2/2014 | Elshishiny et al. |
| 8,677,361 | B2 | 3/2014 | El-Moursy et al. |
| 2001/0056456 | A1 | 12/2001 | Cota-Robles |
| 2003/0158885 | A1 | 8/2003 | Sager |
| 2004/0215939 | A1* | 10/2004 | Armstrong .......... G06F 9/30181 712/220 |
| 2004/0216101 | A1 | 10/2004 | Burky et al. |
| 2004/0216120 | A1* | 10/2004 | Burky ................. G06F 9/30076 718/107 |
| 2005/0038980 | A1 | 2/2005 | Rodgers et al. |
| 2005/0071422 | A1 | 3/2005 | Booth et al. |
| 2007/0220515 | A1 | 9/2007 | Dewitt, Jr. et al. |
| 2007/0300227 | A1 | 12/2007 | Mall et al. |
| 2008/0114973 | A1 | 5/2008 | Norton et al. |
| 2008/0140998 | A1 | 6/2008 | Kissell |
| 2008/0148240 | A1 | 6/2008 | Jones et al. |
| 2008/0270658 | A1 | 10/2008 | Kaneko et al. |
| 2009/0165006 | A1 | 6/2009 | Ceze et al. |
| 2010/0037242 | A1 | 2/2010 | Mannarswamy et al. |
| 2010/0135179 | A1 | 6/2010 | Bauer et al. |
| 2010/0223448 | A1 | 9/2010 | Farrell et al. |
| 2010/0275211 | A1 | 10/2010 | Webber |
| 2010/0332811 | A1 | 12/2010 | Wang et al. |
| 2011/0119682 | A1 | 5/2011 | Hsu et al. |
| 2011/0283286 | A1 | 11/2011 | Wu et al. |
| 2012/0017221 | A1 | 1/2012 | Hankins et al. |
| 2012/0089984 | A1 | 4/2012 | Adar et al. |
| 2012/0137295 | A1 | 5/2012 | Soetemans et al. |
| 2012/0185709 | A1 | 7/2012 | Weissmann et al. |
| 2012/0233442 | A1 | 9/2012 | Shah et al. |
| 2012/0242672 | A1 | 9/2012 | Larson |
| 2012/0260070 | A1 | 10/2012 | Vasekin et al. |
| 2013/0086581 | A1 | 4/2013 | Frazier et al. |
| 2013/0089098 | A1 | 4/2013 | Mital et al. |
| 2013/0139167 | A1 | 5/2013 | Dawson et al. |
| 2013/0179892 | A1 | 7/2013 | Frazier et al. |
| 2013/0191649 | A1 | 7/2013 | Muff et al. |
| 2013/0191832 | A1* | 7/2013 | Busaba ................. G06F 9/4856 718/102 |
| 2013/0191844 | A1 | 7/2013 | Busaba et al. |
| 2013/0212585 | A1 | 8/2013 | Tran |
| 2013/0283280 | A1 | 10/2013 | Cheng et al. |
| 2013/0326527 | A1 | 12/2013 | Suzuki et al. |
| 2013/0346719 | A1 | 12/2013 | Tomlinson et al. |
| 2014/0040556 | A1 | 2/2014 | Walker |
| 2014/0053164 | A1 | 2/2014 | Bishop et al. |
| 2014/0068284 | A1 | 3/2014 | Bhandaru et al. |
| 2014/0095535 | A1 | 4/2014 | Deshmukh et al. |

FOREIGN PATENT DOCUMENTS

| | | |
|---|---|---|
| CN | 102566974 | 7/2012 |
| CN | 103488684 | 1/2014 |
| EP | 1622027 | 2/2006 |
| EP | 2159687 | 3/2010 |
| EP | 2239664 A2 | 10/2010 |
| EP | 2587382 | 5/2013 |
| WO | 2005103887 | 11/2005 |

OTHER PUBLICATIONS

G. Alverson, et al. "Exploiting heterogeneous parallelism on a multithreaded multiprocessor," Proceedings of the 6th international conference on Supercomputing. ACM, Jul. 19-24, 1992, 10 pages.

J. M. May, "MPX: Software for Multiplexing Hardware Performance Counters in Multithreaded Programs," Article Submitted to International Parallell and Distributed Processing Symposium, San Francisco, CA, Apr. 2001, 10 pages.

J. Fruehe, "Planning considerations for multicore processor technology," Dell Power Solutions, May 2005, 6 pages.

K. Koning, "Trap handling with hardware multi-threading," University of Amsterdam, Jun. 12, 2013, 41 pages.

"zArchitecture Principles of Operation," Tenth Edition, Sep. 2012, Publication No. SA22-7832-09, copyright IBM Corp., 886 pages.

International Application No. PCT/EP2015/055444 International Search Report and Written Opinion dated Jun. 22, 2015, 9 pages.

International Application No. PCT/EP2015/055447 International Search Report and Written Opinion dated Jun. 25, 2015, 10 pages.

International Application No. PCT/EP2015/055516 International Search Report and Written Opinion dated Jun. 25, 2015, 10 pages.

International Application No. PCT/EP2015/055521 International Search Report and Written Opinion dated Jul. 9, 2015, 11 pages.

International Application No. PCT/EP2015/055744 International Search Report and Written Opinion dated Jun. 22, 2015, 9 pages.

International Application No. PCT/EP2015/055746 International Search Report and Written Opinion dated Jul. 3, 2015, 10 pages.

U.S. Appl. No. 14/226,989 Notice of Allowance dated Aug. 12, 2015, 29 pages.

UK International Search Report and Written Opinion for International Application No. PCT/EB2015/055571; International Filing Date: Mar. 17, 2015; Date of Mailing Jun. 17, 2015; 10 pages.

* cited by examiner

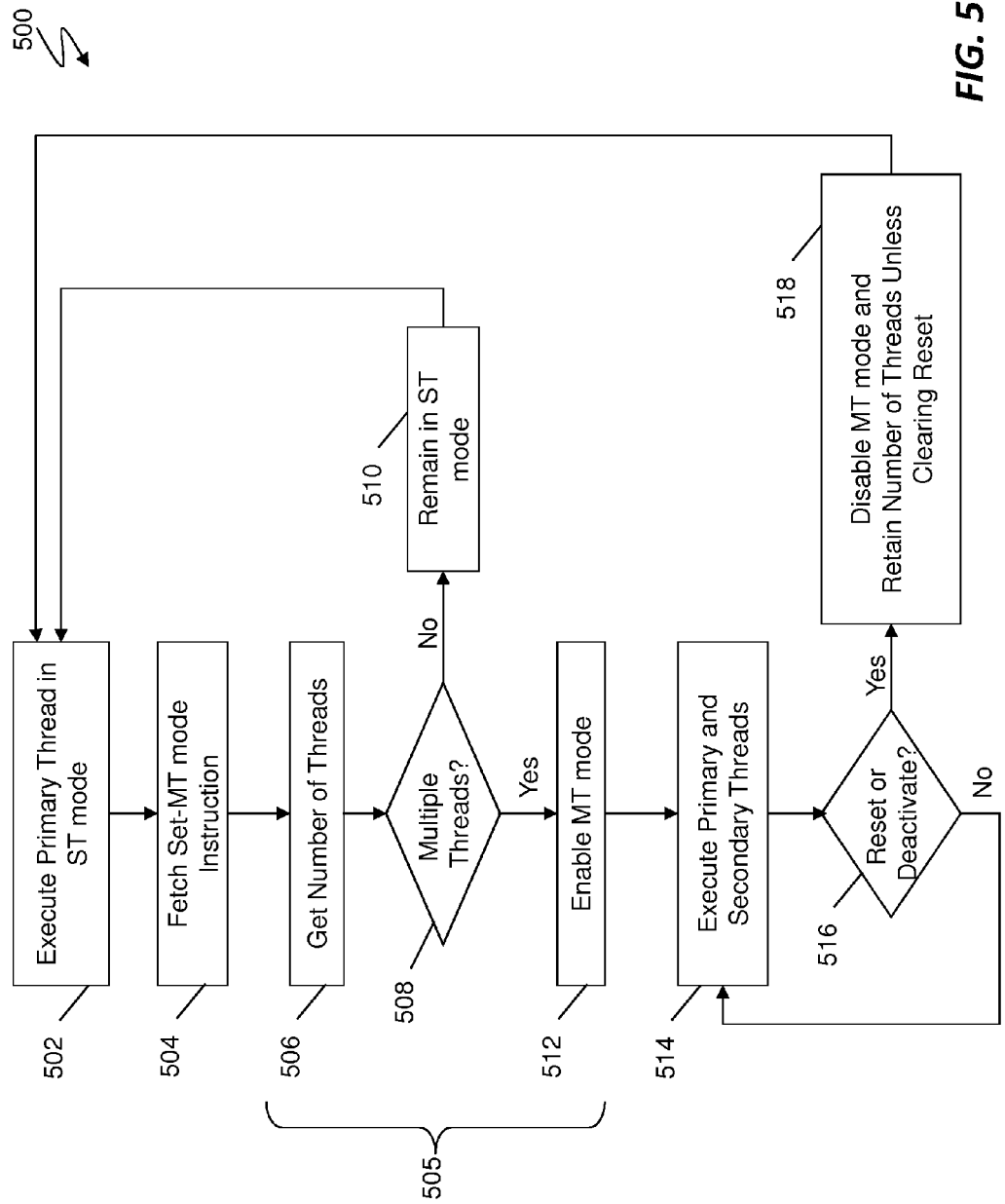

U.S. 9,354,883 B2

DYNAMIC ENABLEMENT OF MULTITHREADING

BACKGROUND

The present invention relates generally to a computer system supporting multiple threads, and more specifically, to dynamic enablement of multithreading in a computer system.

As processor speed of computer systems has increased over the past decades, there has not been a proportional increase in the speed in which the memory of such computer systems can be accessed. Thus, the faster the processor's cycle time, the more pronounced is the delay of waiting for data to be fetched from memory. The effects of such delays have been mitigated by various levels of caching, and in recent processors, by multithreading (MT).

MT allows various core resources of a processor to be shared by a plurality of instruction streams known as threads. Core resources can include execution units, caches, translation-lookaside buffers (TLBs), and the like, which may be collectively referred to generally as a core. During latency caused by a cache-miss or other delay in one thread, one or more other threads can utilize the core resources, thus increasing the utilization of the core resources. In a super-scalar processor simultaneous-multithreading (SMT) implementation, multiple threads may be simultaneously serviced by the core resources of one or more cores.

In contemporary hardware platforms, MT is typically implemented in a manner that is transparent to an operating system (OS) that runs on the MT hardware. One aspect of this characteristic is that the OS does not require modification to utilize the MT hardware. However, transparent MT operation with respect to the OS can result in high variability of response time, capacity provisioning, capacity planning, and billing. This variability can occur because the OS is unaware of whether its tasks have exclusive control of a core, or whether its tasks are executing as threads that share a core. By design, the highest capacity for a memory-intensive workload on MT-capable hardware is achievable when there is a high average thread density when the cores are in use. Additional capacity may be due to increased cache exploitation provided by MT. If an OS does not consistently maintain high average thread densities for utilized cores, then the additional overall throughput capacity provided by MT will not be available. For example, if the hardware runs a single MT thread per core when there is low compute utilization and runs with high thread density when there is high compute utilization, then it can be very difficult to determine how much total MT compute capacity is available to the workload. This hardware variability in the MT thread exploitation can lead to variability in both transaction response times and in billing in a similar fashion as previously described with respect to capacity.

SUMMARY

Embodiments include a system, method, and computer program product for dynamic enablement of multithreading. According to one aspect, a computer system includes a configuration with a core configurable between a single thread (ST) mode and a multithreading (MT) mode. The ST mode addresses a primary thread, and the MT mode addresses the primary thread and one or more secondary threads on shared resources of the core. The computer system also includes a multithreading facility configured to control the configuration to perform a method. The method includes executing in the primary thread in the ST mode, an MT mode setting instruction. A number of threads requested is obtained from a location specified by the MT mode setting instruction. Based on determining that the number of threads requested indicates multiple threads, the MT mode is enabled to execute the multiple threads including the primary thread and the one or more secondary threads.

According to another aspect, a computer-implemented method for dynamic enablement of multithreading in a configuration is provided. The configuration includes a core configurable between an ST mode and an MT mode, where the ST mode addresses a primary thread and the MT mode addresses the primary thread and one or more secondary threads on shared resources of the core. The method includes executing in the primary thread in the ST mode, an MT mode setting instruction. A number of threads requested is obtained from a location specified by the MT mode setting instruction. Based on determining that the number of threads requested indicates multiple threads, the MT mode is enabled to execute the multiple threads including the primary thread and the one or more secondary threads.

A further aspect includes a computer program product for implementing dynamic enablement of multithreading in a configuration. The configuration includes a core configurable between an ST mode and an MT mode, where the ST mode addresses a primary thread and the MT mode addresses the primary thread and one or more secondary threads on shared resources of the core. The computer program product includes a computer readable storage medium having program instructions embodied therewith, where the computer readable storage medium is not a signal. The program instructions are readable by a processing circuit to cause the processing circuit to perform a method. The method includes executing in the primary thread in the ST mode on the core of the configuration, an MT mode setting instruction. A number of threads requested is obtained from a location specified by the MT mode setting instruction. Based on determining that the number of threads requested indicates multiple threads, the MT mode is enabled to execute the multiple threads including the primary thread and one or more secondary threads.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 depicts a process flow for dynamic enablement of multithreading in accordance with an embodiment;

DETAILED DESCRIPTION

Figure 1A:
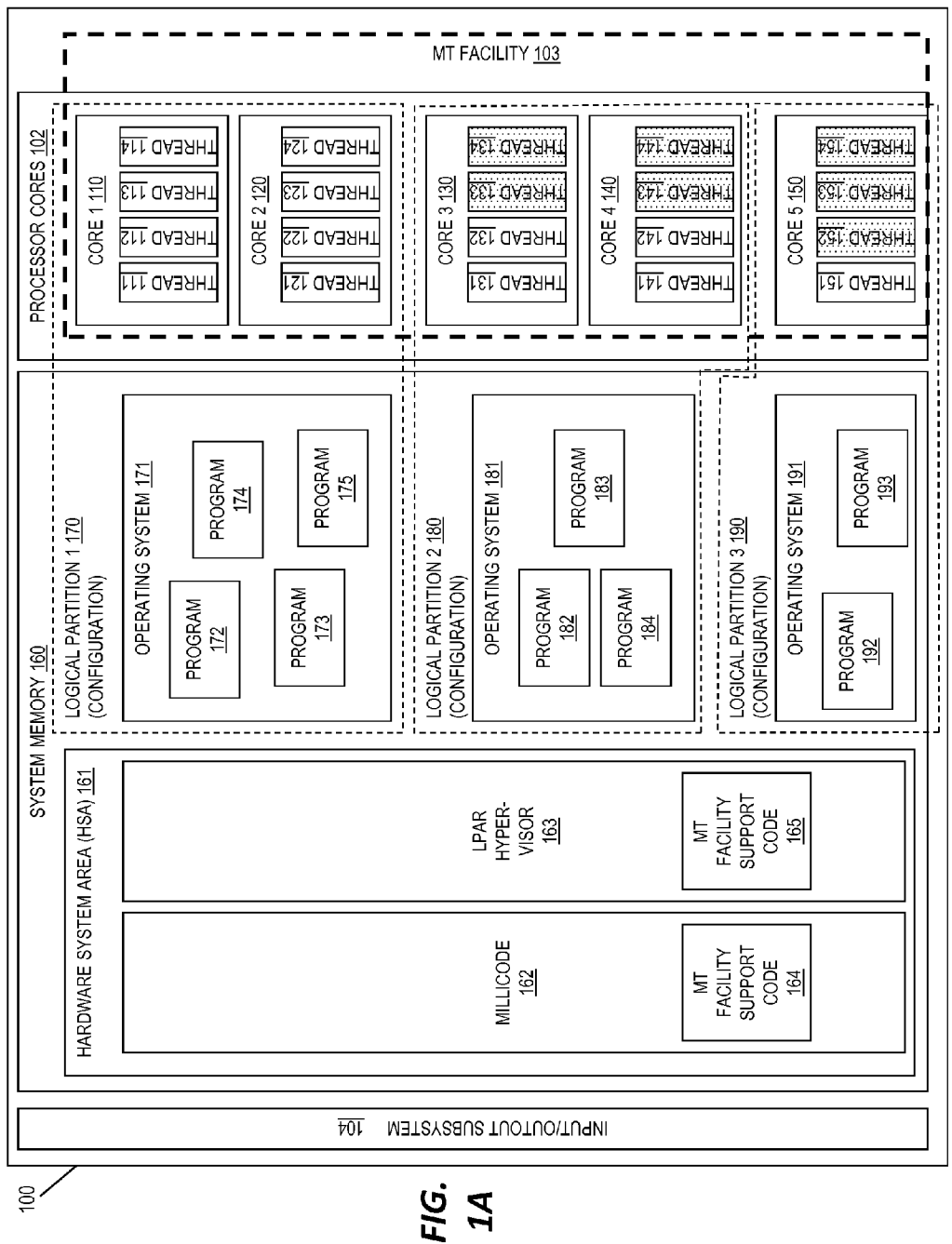
FIG. 1A depicts a computing environment that may be implemented in accordance with an embodiment.

Exemplary embodiments provide multithreading operation in a computer system that supports a single thread and a multithreading mode of operation. As used herein, a logical thread refers to a single instruction stream and its associated state. That is, at an architecture level, each logical thread represents an independent central processing unit (CPU) or processor. At a hardware level, a thread is the execution of an instruction stream associated with a logical thread, combined with the maintaining of that guest state, when the thread is dispatched. Therefore, the terms "thread" and "CPU" may be used interchangeably herein.

In an exemplary embodiment, a CPU contains sequencing and processing facilities for instruction execution, interruption action, timing functions, initial program loading, and other machine-related functions. A CPU defines logical functions that may map to a variety of underlying physical implementations. The CPU, in executing instructions, can process binary integers and floating-point numbers (e.g., binary, decimal, and hexadecimal) of fixed length, decimal integers of variable length, and logical information of either fixed or variable length. Processing may be in parallel or in series. The width of processing elements, multiplicity of shifting paths, and the degree of simultaneity in performing different types of arithmetic can differ from one model of CPU to another without affecting the logical results.

Instructions which the CPU executes can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer-arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. Privileged control instructions and the I/O instructions can be executed when the CPU is in a supervisor state, and semi-privileged control instructions can be executed in a problem state, subject to appropriate authorization mechanisms.

The CPU provides registers which are available to programs but do not have addressable representations in main storage. The registers can include, for instance, a current program-status word (PSW), general registers, floating-point registers and a floating-point-control register, vector registers, control registers, access registers, a prefix register, a time-of-day (TOD)-programmable register, and registers for a clock comparator and CPU timer. This set of registers may be referred to as the CPU's architected register context. Each CPU in a configuration can provide access to a TOD clock, which may be shared by all CPUs in the configuration. An instruction operation code can determine which type of register is to be used in an operation.

Each CPU may have a type attribute that indicates whether it provides a full complement of functions and facilities (e.g., a general CPU), or whether it is intended to process specific types of workloads (e.g., a specialty CPU). A primary CPU is either a general CPU or a CPU having the same type as the CPU started following a last initial program load (IPL) operation (the IPL CPU). A secondary CPU is any CPU other than a general CPU having a CPU type that differs from the IPL CPU.

A multithreading facility may be available on a computer system that implements a supporting architecture. The multithreading facility provides support for multithreading to enable a group of threads, which may also be referred to as CPUs, that share a core. When the multithreading facility is enabled, the CPUs within a core may share certain hardware resources such as execution units or caches. When one CPU in a core is waiting for hardware resources (typically, while waiting for a memory access), other CPUs in the core can utilize the shared resources in the core rather than have them remain idle. When the multithreading facility is installed and enabled, a thread is synonymous with a CPU that is a member of a core. When the multithreading facility is not installed, or the facility is installed but not enabled, a core comprises a single CPU or thread.

When the multithreading facility is installed, it may be enabled by execution of a set-multithreading signal processor (SIGP) order. In an exemplary embodiment, when the multithreading facility is enabled, the number of CPUs in a configuration is increased by a multiple, the value of which is determined by a program-specified maximum thread identification (PSMTID). The number of CPUs in a core can be one more than the PSMTID. A number of CPUs corresponding to this multiple are grouped into a core. Each core of the same CPU type in a configuration can have the same number of CPUs. Each CPU within a core is of the same CPU type; however, based on the model and CPU type, some CPUs within a core may not be operational.

In an exemplary embodiment, a control program, such as an operating system (OS), explicitly enables multithreading in order for it to be usable by the configuration that the OS manages. Alternatively, a hypervisor can enable multithreading and guests of the hypervisor and their applications can benefit transparently. An application program is generally unaware of whether multithreading has been enabled. When multithreading is enabled, the CPU addresses of all CPUs in the configuration are adjusted to include a core identification (or core ID) in the leftmost bits of the address and a thread identification (thread ID, or TID) in the rightmost bits of the address. The core ID may also be referred to as a core address value, and the TID may be referred to as a thread address value. CPUs within a core may share certain hardware facilities such as execution units or lower-level caches, thus execution within one CPU of a core may affect the performance of other CPUs in the core.

In order to manage changes associated with dynamically switching one or more cores of a configuration between single thread and multithreading modes, a number of support features are included. To maintain compatibility with programs that do not support multithreading, a single thread mode may be the default mode upon a reset or deactivation. Exemplary embodiments include features to preserve, communicate, and restore thread context from the multithreading mode to support analysis and/or restoration of the thread context after transitioning from the multithreading mode to the single thread mode.

A computing environment that may be implemented by an exemplary embodiment can be based, for example, on the z/Architecture offered by International Business Machines Corporation, Armonk, N.Y. The z/Architecture is described in an IBM® publication entitled, "z/Architecture Principles of Operation," IBM Publication No. SA22-7832-09, August 2012, which is hereby incorporated herein by reference in its entirety. In one example, a computing environment based on the z/Architecture includes an eServer zSeries, offered by International Business Machines Corporation, Armonk, N.Y. A computing environment can include, for example, a processor complex with one or more partitions (e.g., logical partitions) with one or more cores (e.g., processor cores), and one or more levels of hypervisors as further described herein.

FIG. 1A shows a computer system 100 as an example of a computing environment that supports multithreading (MT). In the example of FIG. 1A, the computer system 100 includes a plurality of processor cores 102, an input/output (I/O) subsystem 104, and system memory 160. The I/O subsystem 104 can provide access to I/O devices known in the art. The processor cores 102, also referred to simply as "cores" herein, can include processing circuitry with supporting elements. In the example of FIG. 1A, five cores 102 are depicted as core1 110, core2 120, core3 130, core4 140, and core5 150; however, a greater or fewer number of cores 102 is also contemplated. An MT facility 103 may be a hardware component of each of the cores 102. In this example, each of the cores 102 is capable of supporting up to four threads. For instance, core1 110 can support threads 111, 112, 113, and 114. Core2 120 can support threads 121, 122, 123, and 124. Core3 130 can support threads 131, 132, 133, and 134. Core4 140 can support threads 141, 142, 143, and 144. Core5 150 can support threads 151, 152, 153, and 154. Note that not all four threads of each core 102 may be operational at any instant. For example, in core3 130, threads 131 and 132 can be operational while threads 133 and 134 are allowed to be operational (depicted with shading).

FIG. 1A also depicts the system memory 160 of the computer system 100, where parts of the system memory 160 are apportioned to logical partition1 (LPAR1) 170, LPAR2 180, and LPAR3 190. The LPARs 170, 180, 190 represent virtualized computing systems (also known as configurations) in which an operating system such as Linux™ or the IBM® z/OS™, z/VM, or zTPF operating system may be executed. FIG. 1A also shows the apportionment of the cores 102 to the LPARs 170, 180, 190. In this illustration, core1 110 and core2 120 are dedicated for use by LPAR1 170. Core3 130 is dedicated for use by LPAR2 180, and core5 150 is dedicated for use by LPAR3 190. Core4 140 may be shared between LPAR2 180 and LPAR3 190, but is shown as being assigned to LPAR2 180 in FIG. 1A. LPAR3 190 shows an example of two different types of cores 102 being employed by the partition, where core4 140 allows multiple threads to be operational, but core5 150 does not allow multiple threads to be operational in this example. In the example of FIG. 1A, LPAR1 170 provides processing resources for OS 171 and programs 172, 173, 174, and 175. LPAR2 180 provides processing resources for OS 181 and programs 182, 183, and 184. LPAR4 190 provides processing resources for OS 191 and programs 192 and 193.

Under control of an operating system executing in an LPAR, programs are executed on the threads of a core. In an exemplary embodiment, an individual thread executes only one program at time; however, a program that is designed to be re-entrant may be executed on multiple threads or cores simultaneously. For example, program 172 of OS 171 of LPAR1 170 may be executing on threads 111 and 113 in core1 110 and in threads 121 and 124 of core2 120. Subject to the control of an OS, different programs may be dispatched on the same or different threads, subject to dispatching rules and quality-of-service agreements.

Also residing in the system memory 160 are various levels of firmware, including for example, Millicode 162 and LPAR hypervisor 163. The Millicode 162 can be embodied as firmware to support lower-level system functions. The LPAR hypervisor 163 may be, for example, licensed internal code such as the IBM Processor-Resource/System Manager™ (PR/SM™). The LPAR hypervisor 163 can establish the LPARs 170, 180, 190 and may manage dispatching on the cores 102. When the MT facility 103 is installed in the computer system 100, the Millicode 162 and LPAR hypervisor 163 also contain MT facility support code 164 and 165 respectively. The MT facility support code 164 and 165 may be considered part of the MT facility 103, as logic to support MT can be distributed between the Millicode 162, LPAR hypervisor 163, and the cores 102. Although not depicted, each of the OSs 171, 181, 191 can also include MT facility support code to enable and exploit MT in their respective LPARs 170, 180, 190.

Figure 1B:
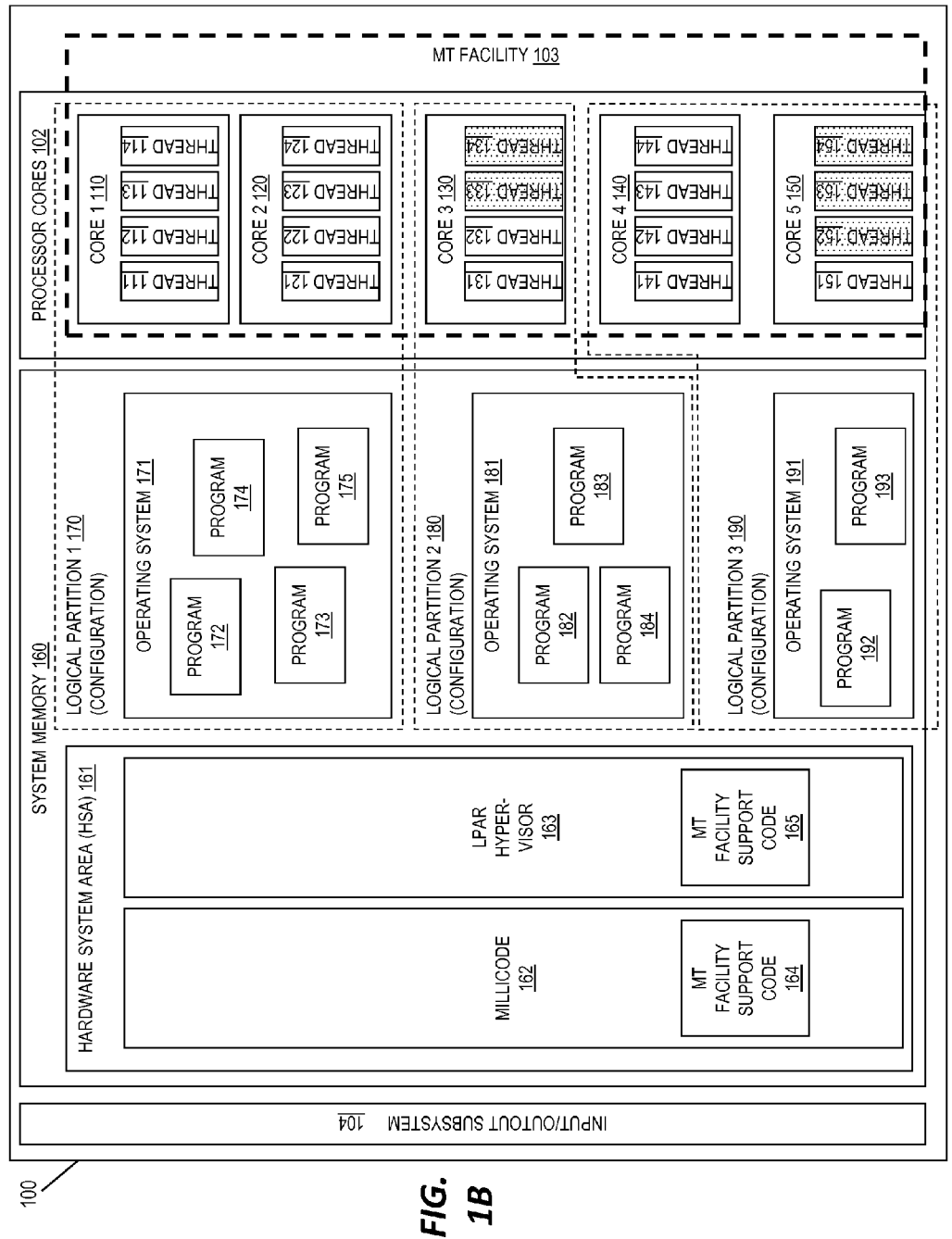
FIG. 1B depicts a computing environment that may be implemented in accordance with an embodiment.

FIG. 1B shows the same computing system 100 as FIG. 1A, except that in the computing environment of FIG. 1B, core4 140 is now assigned to LPAR3 190 instead of LPAR2 180. Also note that unlike FIG. 1A, where threads 143 and 144 were not operational, in FIG. 1B, all four threads 141-144 are currently operational when LPAR3 190 is dispatched on core4 140. The dispatching and undispatching of an LPAR on a core 102 is dynamic, and at other times other LPARs (not shown) may be operating on the same cores 102.

Figure 2:
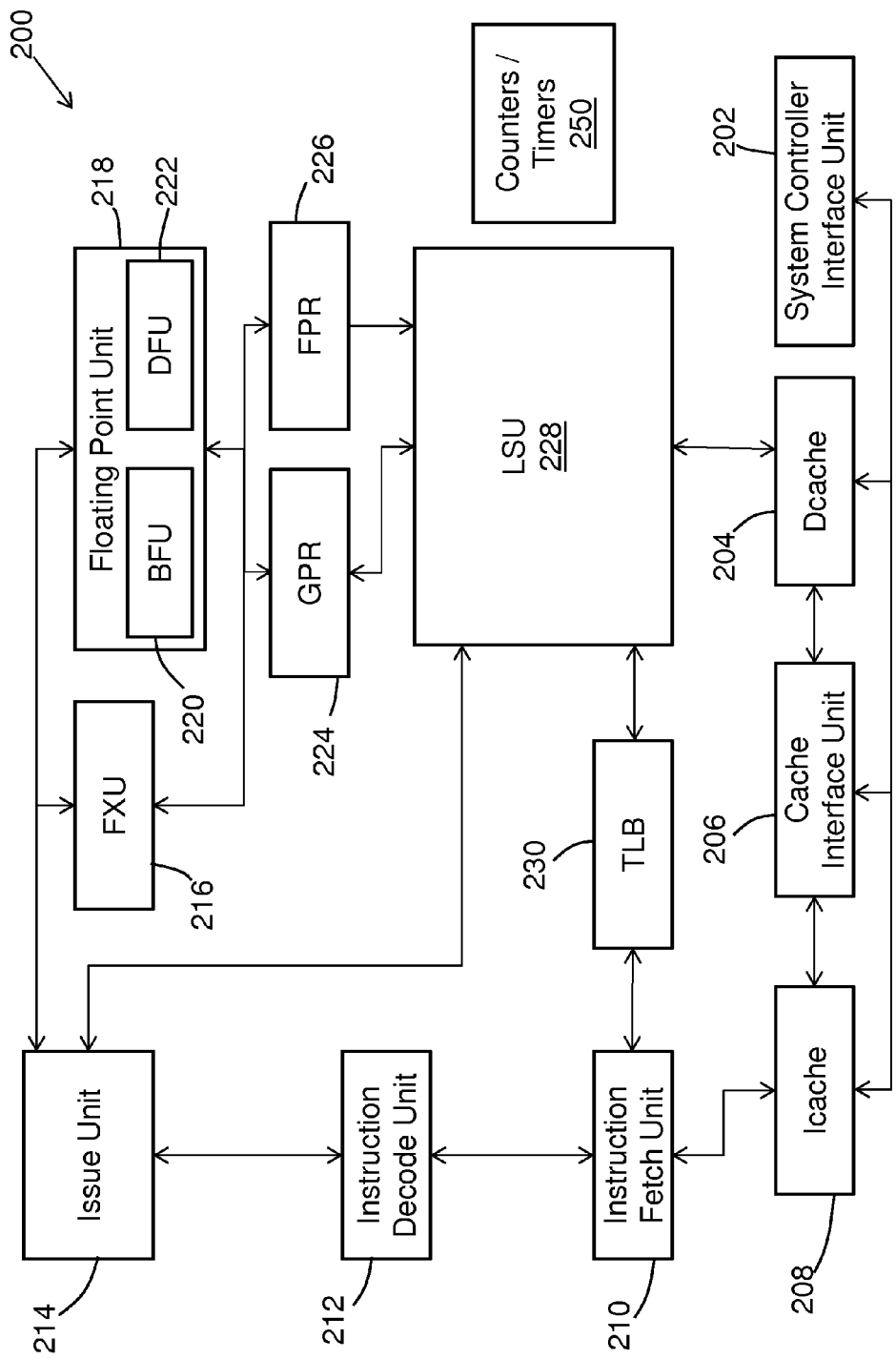
FIG. 2 depicts processing circuitry of a core that may be implemented in accordance with an embodiment.

Turning now to FIG. 2, a block diagram of processing circuitry 200 for implementing a processing core, such as one of the cores 102 in FIGS. 1A and 1B, is generally shown in accordance with an embodiment. The processing circuitry 200 is an example of a processing circuit that can support one or more threads simultaneously in a MT environment. The processing circuitry 200 shown in FIG. 2 includes a system controller interface unit 202 that can couple the processing circuitry 200 to other processors and peripheral devices. The system controller interface unit 202 can also connect a Dcache 204, which reads and stores data values, an Icache 208, which reads program instructions, and a cache interface unit 206 to external memory, processors, and other peripheral devices.

The Icache 208 can provide loading of instruction streams in conjunction with an instruction fetch unit (IFU) 210, which pre-fetches instructions and may include speculative loading and branch prediction capabilities. The fetched instructions can be provided to an instruction decode unit (IDU) 212 for decoding into instruction processing data.

The IDU 212 can provide the instructions to an issue unit 214 which can control the issuing of the instructions to various execution units, such as one or more fixed point units (FXU) 216 for executing general operations and one or more floating point units (FPU) 218 for executing floating point operations. The FPUs 218 can include a binary floating point unit (BFU) 220, a decimal floating point unit (DFU) 222, or any other floating point unit. The issue unit 214 can also be coupled to one or more load/store units (LSU) 228 via one or more LSU pipelines. The multiple LSU pipelines are treated as execution units for performing loads and stores and address generation for branches. Both the LSU 228 and the IFU 210 can utilize a translation-lookaside-buffer (TLB) 230 to provide buffered translations for the operand and instruction addresses.

The FXU 216 and FPU 218 are coupled to various resources such as general-purpose registers (GPR) 224 and floating point registers (FPR) 226. The GPR 224 and FPR 226 provide data value storage for data values loaded and stored from the Dcache 204 by a LSU 228.

The processing circuitry 200 can also include counters and/or timers 250 to support system time-base generation and diagnostic actions. For example, the counters and/or timers 250 may be used to support time-of-day, as well as various diagnostic and measurement facilities.

Figure 3:
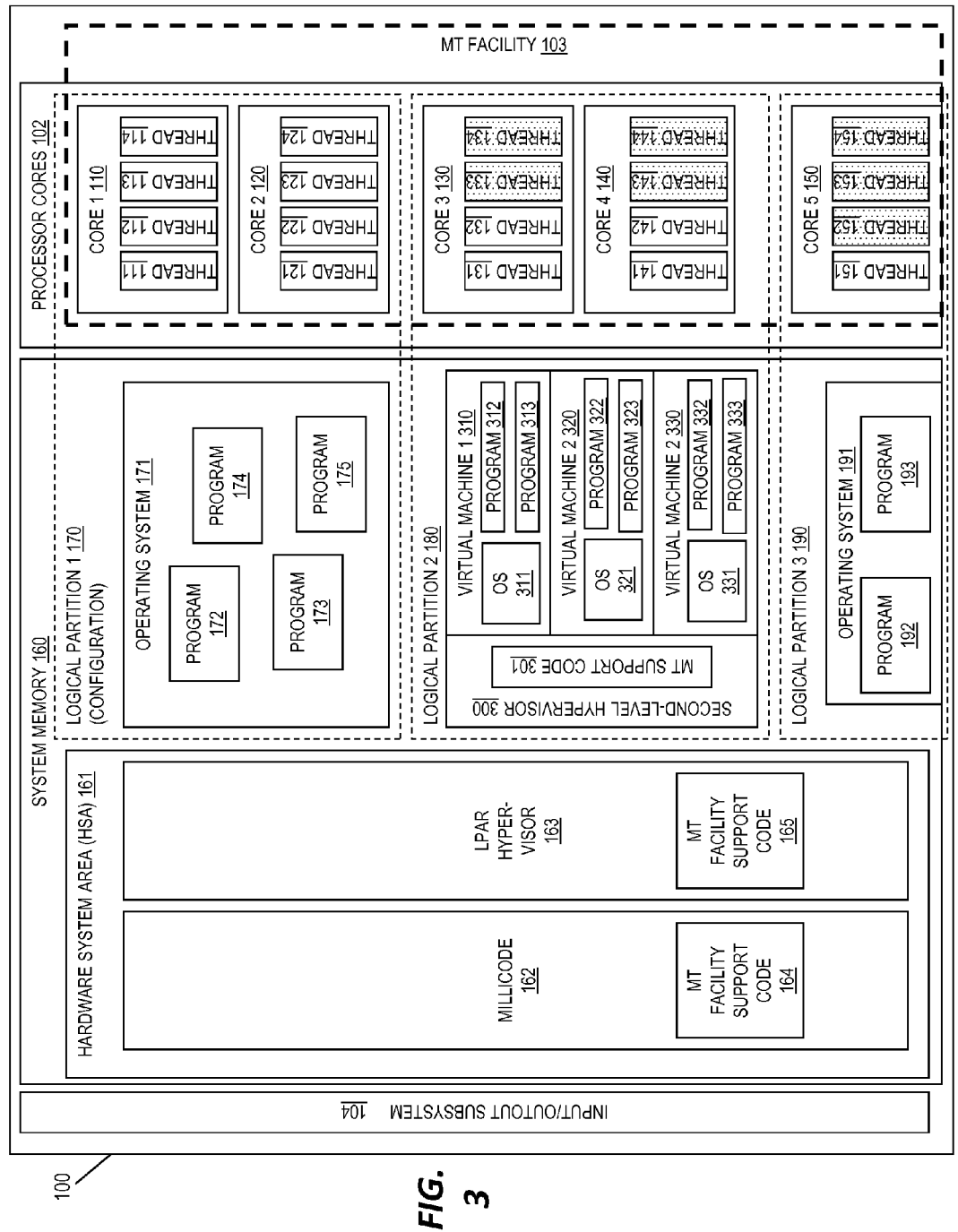
FIG. 3 depicts a computing environment that may be implemented in accordance with an embodiment.

Turning now to FIG. 3, a computing environment similar to FIG. 1A is depicted except that in FIG. 3, a second-level hypervisor 300 is executing in LPAR2 180 of the computer system 100. The second-level hypervisor 300, for example, the IBM z/VM operating system, includes MT support code 301, similar to the MT support code 165 provided by the LPAR (first-level) hypervisor 163. The second-level hypervisor 300 provides support for a plurality of virtual machines 310, 320, and 330 (also referred to as configurations) in which guest operating systems 311, 321, and 331 operate respectively. The guest operating systems 311, 321, and 331 may include, for example, Linux™ or the IBM® z/OS™, z/VM, or z/TPF OS, or may include a guest development environment such as the IBM conversational monitor system (CMS). Each guest OS 311, 321, and 331 may or may not enable multithreading, in which case the second-level hypervisor 300 may be responsible for dispatching the guest OSs 311, 321, 331 and associated programs 312, 313, 322, 323, 332, and 333 using the physical processing resources (cores 130, 140 and threads 131-134, 141-144) that are available to the LPAR2 180 in which the second-level hypervisor 300 operates. The programs 312, 313, 322, 323, 332, 333 of the various virtual machines 310, 320, 330 can execute on the threads 131-134, 141-144 available to the respective guest OSs 311, 321, and 331. The guest OSs 311, 321, and 331 need not include MT support code, as they can benefit from MT transparently if the second-level hypervisor 300 exploits multithreading.

Figure 4:
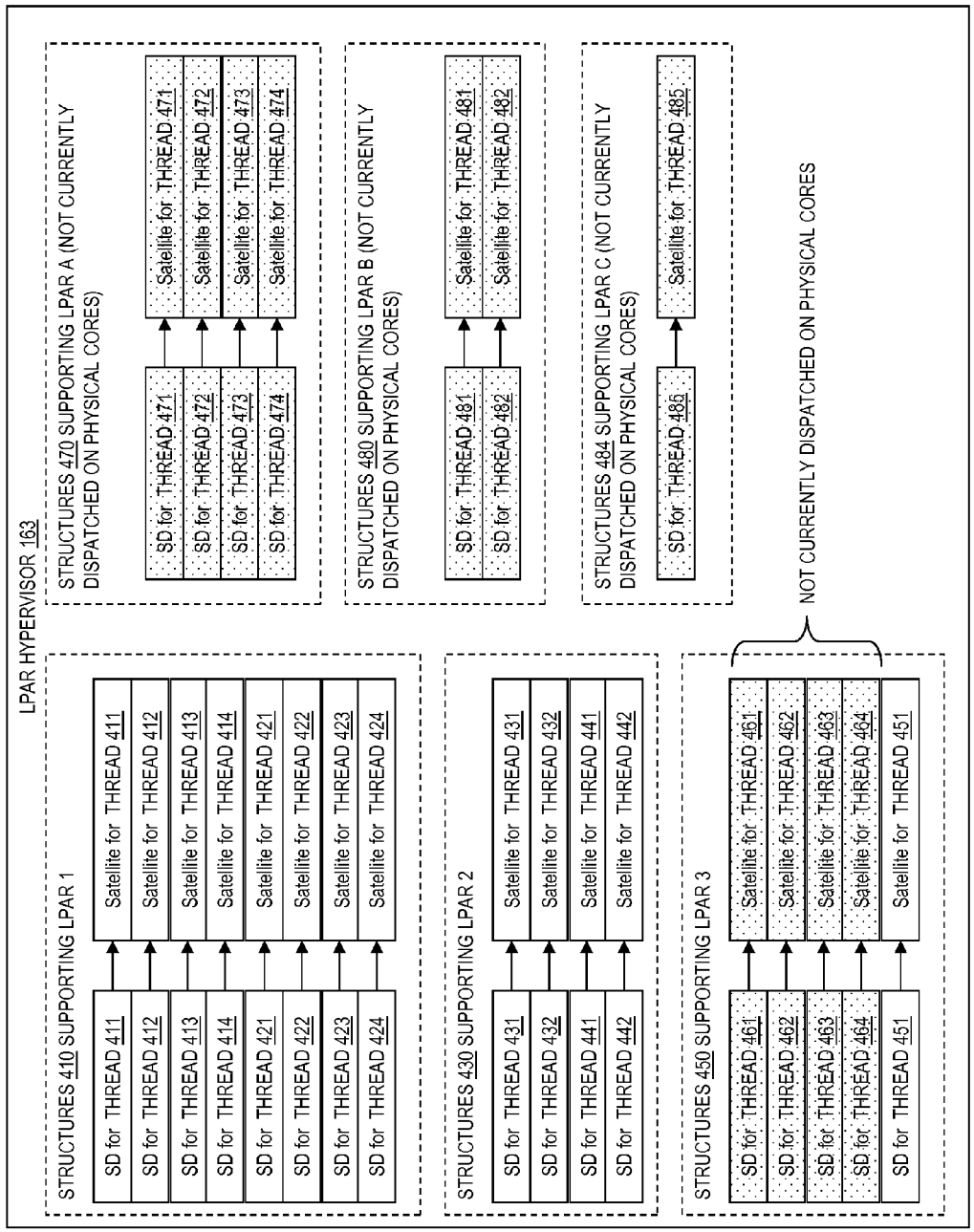
FIG. 4 depicts an example of hypervisor context retention in a computing environment that may be implemented in accordance with an embodiment.

Turning now to FIG. 4, an example of hypervisor context retention in a computing environment that may be implemented in accordance with an embodiment is depicted. In the example of FIG. 4, a number of support structures are depicted within the LPAR hypervisor 163 of FIGS. 1A and 1B. For example, structures 410 can support LPAR1 170 of FIG. 1A, including state descriptions and satellite blocks that store architected register context (i.e., thread context) for logical threads 411, 412, 413, 414, 421, 422, 423, 424 which are currently running on physical threads 111, 112, 113, 114, 121, 122, 123, 124 as shown in FIG. 1A. While these logical threads are dispatched, the physical threads hold the current architected register context of the threads. The architected register context will be maintained in the state descriptions and satellite blocks when they are no longer dispatched. Structures 430 can support LPAR2 180 of FIG. 1A, including state descriptions and satellite blocks that store architected register context for logical threads 431, 432, 441, 442 which are currently running on physical threads 131, 132, 141, 142 as shown in FIG. 1A. Structures 450 can support LPAR3 190 of FIG. 1A, including state descriptions and satellite blocks that store architected register context for logical threads 451 which is currently running on physical thread 151 as shown in FIG. 1A. Structures 450 also include state descriptions and satellite blocks that store architected register context for logical threads 461, 462, 463 and 464 which are not currently dispatched on a physical processor (as shown with shading). Other structures supporting LPARs that are not dispatched on physical cores can also be retained by the LPAR hypervisor 163, such as structures 470 for an LPAR A (not depicted in FIG. 1A) including state descriptions and satellite structures for logical threads 471, 472, 473, and 474. Further structure examples include structures 480 supporting non-dispatched LPAR B (not depicted in FIG. 1A) including state descriptions and satellite structures for logical threads 481 and 482, as well as structures 484 for non-dispatched LPAR C (not depicted in FIG. 1A) for logical thread 485.

Although a number of structures are depicted in the example of FIG. 4, it will be understood that additional structures can be supported by the LPAR hypervisor 163 and elsewhere in computer system 100 to manage multithreading. For example, structures to support multithreading of virtual machines 310, 320, 330 of FIG. 3 can be retained by the second-level hypervisor 300 of FIG. 3.

Turning now to FIG. 5, a process flow 500 for dynamic enablement of multithreading is depicted in accordance with an embodiment. At block 502, a primary thread executes in a single thread (ST) mode. At block 504, a multithreading (MT) mode setting instruction is fetched in the ST mode. In executing this instruction as depicted collectively at 505, a number of threads requested from a location specified by the MT mode setting instruction is obtained at block 506. The location can be specified by a parameter register when issuing the set-MT mode instruction. The MT mode setting instruction can be a signal processor (SIGP) instruction including a set-MT order and a program-specified maximum thread-id (PSMTID) associated with the number of threads requested. An example of a process associated with a set-MT order of a SIGP instruction is further described herein in reference to FIG. 7.

Continuing with process 500, at block 508, a determination is performed as to whether the number of threads requested indicates multiple threads. For example, multiple threads can be indicated by a value greater than one. In embodiments where a value of zero indicates a single thread, a value of one or more than one can indicate multiple threads. Based on determining that the number of threads requested does not indicate multiple threads, the core remains in ST mode at block 510, the execution of the set-MT mode instruction is complete, and control returns to block 502. Based on determining that the number of threads requested indicates multiple threads, MT mode is enabled at block 512, and the execution of the set-MT mode instruction is complete. At block 514, multiple threads are executed including the primary and one or more secondary threads. At block 516, if there is no reset or deactivation, the process 500 loops back to block 514; otherwise, at block 518, MT mode is disabled based on a reset or a deactivation of the configuration which reverts to ST mode. As part of disabling the MT mode, the number of threads (PSMTID) is retained for a non-clearing reset or zeroed for a clearing reset. The process 500 returns to block 502.

A CPU can enter a load state when a load-normal, load-with-dump, load-clear, or load-clear-list-directed key is activated. If a channel-command word (CCW)-type initial-program-loading operation is completed successfully, the CPU changes from the load state to the operating state.

A CPU reset can be used to clear equipment-check indications and any resultant unpredictability in the CPU state with the least amount of information destroyed. In particular, it can be used to clear check conditions when the CPU state is to be preserved for analysis or resumption of the operation. If a CPU reset is caused by the activation of the load-normal or load-with-dump key, (a) it can set an architectural mode to a default mode, and (b) if the multithreading facility is installed and enabled, multithreading is disabled. When the CPU reset sets the default mode, it can save the current PSW so that PSW can be restored.

An initial CPU reset provides functions of a CPU reset together with initialization of the current PSW, CPU timer, clock comparator, and other registers, such as: breaking-event-address, captured-PSW, control, floating-point-control, prefix, and TOD programmable registers. The initial CPU reset can set the architectural mode to the default mode if it is caused by activation of the load-normal or load-with-dump key. If multithreading is enabled when an initial CPU reset is caused by activation of the load-normal or load-with-dump key, the initial-CPU-reset functions can be performed for the lowest-numbered CPU of a core, and the CPU reset is performed for all other CPUs in the core. A clearing reset causes the initial CPU reset and subsystem reset to be performed and, additionally, clears or initializes all storage locations and registers in all CPUs in the configuration, with the exception of the TOD clock. Clearing does not affect external storage, such as direct-access storage devices used by the control program to hold the contents of unaddressable pages.

A CPU power-on reset causes the initial CPU reset to be performed and clears the contents of general registers, access registers, control registers, and floating-point registers to zeroes/default values with a valid checking-block code. It will be understood that clearing or initializing of states need not be to zero values but can default to non-zero values in the cleared state. If a CPU power-on reset establishes the configuration, it can set the architectural mode to the default mode; otherwise, it may set the architectural mode to that of the CPUs already in the configuration. CPU reset, initial CPU reset, subsystem reset, and clear reset may be initiated manually.

In exemplary embodiments, each CPU has a number assigned, called its CPU address. A CPU address uniquely identifies one CPU within a configuration. A CPU is designated by specifying this address in a CPU-address field of a SIGP instruction. A CPU signaling a malfunction alert, emergency signal, or external call can be identified by storing this address in the CPU-address field with the interruption. The CPU address is assigned by a configuration-definition process and is not typically changed as a result of reconfiguration changes. A program can determine the address of a CPU by using a store CPU address instruction. The store CPU address instruction can also be used to identify a CPU address by which a CPU is identified in a multiprocessing configuration.

When multithreading is enabled, the CPU address can include a core identification (core ID), concatenated with an identification of a CPU within the core. The CPU identification within a core is a thread identification (thread ID, or TID). Within a configuration, all cores provide the same number of CPUs; however, depending on the model and CPU type, some CPUs in a core may not be operational.

Based on the PSMTID of a parameter register used by the signal processor set multithreading order, a fixed number of bits represent the thread identification. This number of bits is referred to as the TID width.

The core ID can be formed from the rightmost bits of the CPU address before multithreading is enabled. The core ID is shifted left by TID-width bits, resulting in the leftmost bits of the CPU address after multithreading is available. The thread ID has the same TID-width number of bits, and occupies the rightmost bits of the CPU address after multithreading is enabled. Thread IDs can be assigned in a contiguous range of numbers. Table 1 illustrates an example relationship of the PSMTID, the TID width and the CPU-address bits comprising the core identification and thread identification.

TABLE 1

Example address bit mapping

| | | CPU Address Bits | |
|---|---|---|---|
| PSMTID | TID Width | Core ID | Thread ID |
| 0 | 0 | 0-15 | — |
| 1 | 1 | 0-14 | 15 |
| 2-3 | 2 | 0-13 | 14-15 |
| 4-7 | 3 | 0-12 | 13-15 |
| 8-15 | 4 | 0-11 | 12-15 |
| 16-31 | 5 | 0-10 | 11-15 |

Figure 6A:
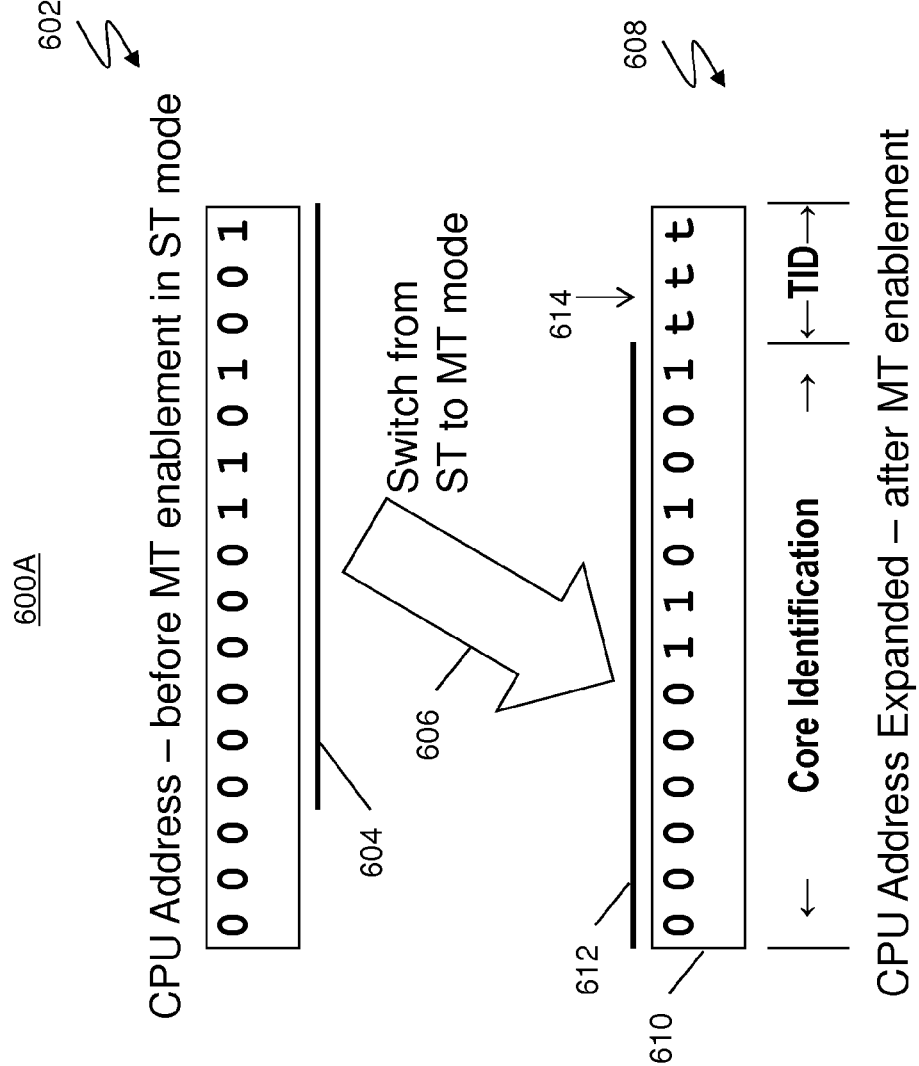
FIG. 6A depicts an example of a CPU address expansion process in accordance with an embodiment.

Address expansion is depicted in FIG. 6A as an example of a CPU address expansion process 600A in accordance with an embodiment. At block 602, a primary thread can be accessed in the ST mode using a core address value 604 as a number of CPU address bits. Arrow 606 indicates switching from the ST mode to the MT mode. At block 608, the primary thread or one or more secondary threads can be accessed in the MT mode using an expanded address value 610. The expanded address value 610 includes the core address value 604 shifted as a shifted core address value 612 and concatenated with a thread address value 614. The shifted core address value 612 is a core identifier (core ID), and the thread address value 614 is a thread identifier (TID). The shifted core address value 612 can be shifted by an amount based on a requested maximum thread identifier, e.g., PSMTID. A number of TID bits in the thread address value 614 can be determined based on the PSMTID as shown in table 1 above. The thread address value 614 can be concatenated to low order bits of the shifted core address value 612 to form the expanded address value 610. A thread address value 614 of all zeroes would designate the primary thread, and values greater than zero identify and address secondary threads.

Figure 6B:
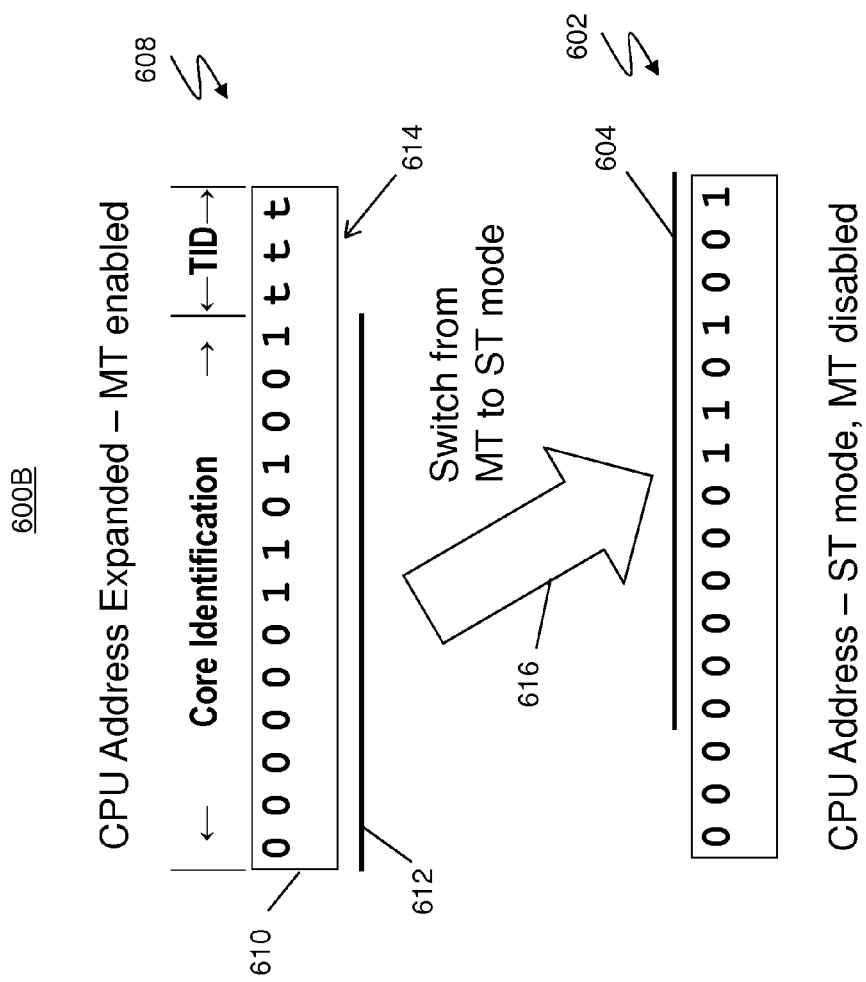
FIG. 6B depicts an example of a CPU address contraction process in accordance with an embodiment.

When switching between the MT mode and ST mode, either the core address value 604 (ST mode) or the expanded address value 610 (MT mode) is selected to use as a CPU address in a respective ST mode or MT mode. The core address value 604 is an example of a standard-format address used in ST mode, and the core reverts from the MT mode to the ST mode based on disabling the MT mode. In an exemplary embodiment, only the primary thread (i.e., not secondary threads) is accessible based on disabling the MT mode. FIG. 6B depicts an example of a CPU address contraction process 600B in accordance with an embodiment. Arrow 616 of FIG. 6B illustrates switching from the MT mode of block 608 back to the ST mode of block 602. Reversion from the MT mode to the ST mode can include shifting the expanded address value 610 to the right and eliminating the thread address value 614 to form a standard-format address including the core address value 604 (core ID) as the CPU address from the shifted core address value 612.

When a reset function disables multithreading, (a) the CPU address(es) of the CPU(s) having the thread-ID zero are shifted to the right by the same TID-width number of bits used during enablement, (b) zeroes are inserted in the TID-width number of bits on the left of the address, and (c) the CPU address reverts to its original non-multithreading format (i.e., standard-format address). All CPUs in a core having nonzero thread IDs when multithreading is enabled are no longer operational when multithreading is disabled.

When multithreading is not enabled, the CPU address remains unchanged from the value assigned by the configuration-definition process. In this case, the thread identification does not exist.

A number of signal processor orders can provide orders to CPUs including, for example, start, stop, restart, stop and store status, initial CPU reset, CPU reset, store status at address, set architecture, sense running status, set multithreading, store additional status at address, and the like. An initial CPU reset or a CPU reset can be initiated by a signal processor instruction and does not affect the architectural mode or other CPUs, does not disable multithreading, and does not cause I/O to be reset.

A set architecture order specifies an architectural mode to which all CPUs in the configuration are to be set. Architecture differences can include different addressing modes, register definitions, and instructions supported by the CPUs. Upon a change in architectural mode, select bit fields of registers can be set to a default state (e.g., zeroed), access-register-translation lookaside buffers (ALBs) and translation lookaside buffers (TLBs) of all CPUs in the configuration are cleared, and a serialization and checkpoint-synchronization function can be performed on all CPUs in the configuration.

A sense running status order can indicate whether an addressed CPU is running. In ST mode, an indicator can be returned as a running/not running status. In MT mode, an indicator can be used to identify whether any CPU of the core in which the addressed CPU is a member is running, or all CPUs of the core in which the addressed CPU is a member are not running.

Figure 7:
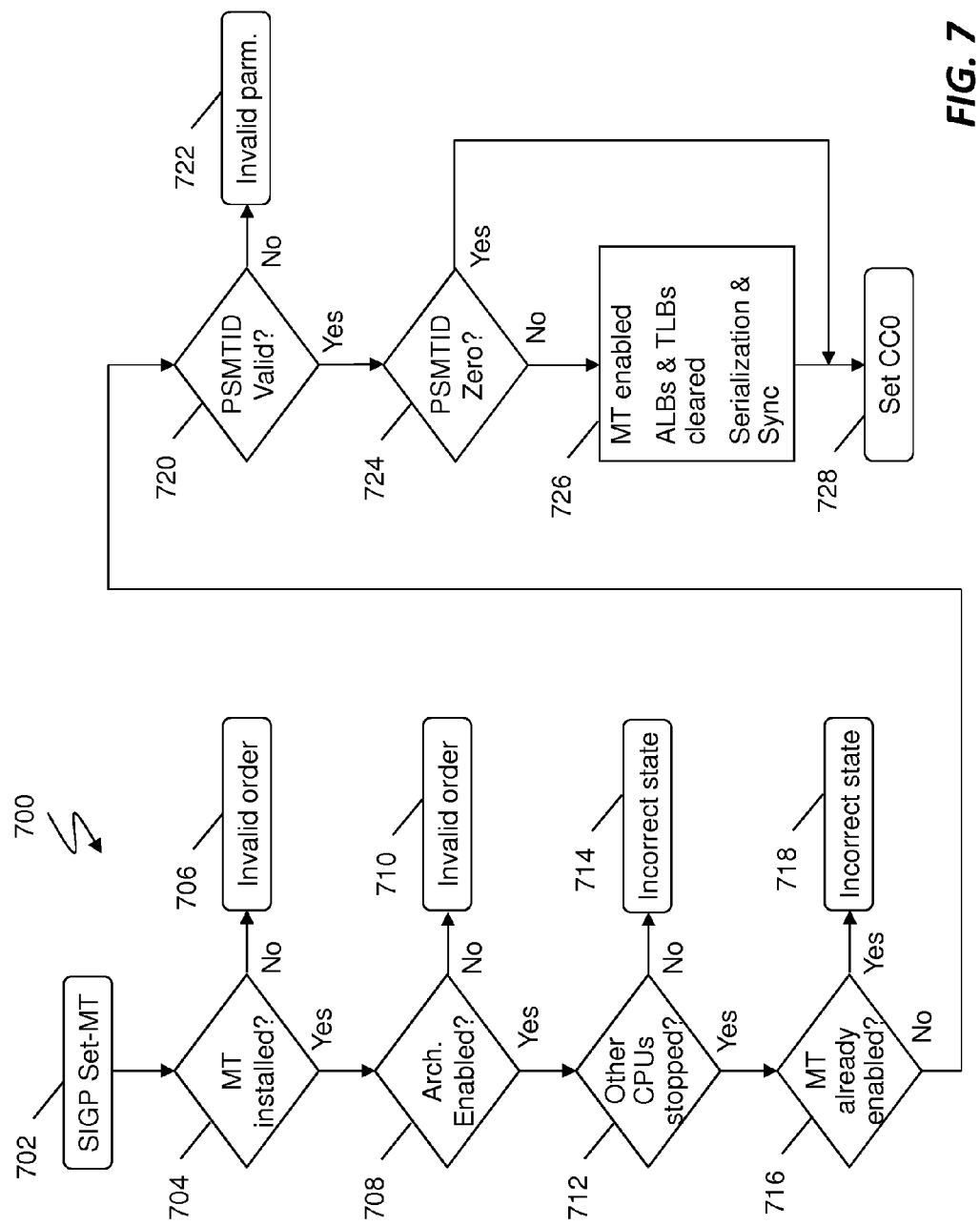
FIG. 7 depicts a process flow for a set-multithreading order in accordance with an embodiment.

A set-MT order enables the multithreading facility. Bit positions of a parameter register can contain the PSMTID to be provided in the configuration. The PSMTID can be defined as one less than the number of CPUs to be made addressable in each core. For example, a value of 3 in designated bit positions indicates that a maximum of four threads are to be provided. The contents of a CPU-address register of the SIGP instruction can be ignored as all CPUs in the configuration are considered to be addressed. If accepted, the set-MT order is completed by all CPUs during the execution of the SIGP instruction. With reference to FIG. 7, a process 700 for a SIGP set-MT order 702 is depicted. An error indication can be provided and enablement of the MT mode prevented based on determining that the SIGP set-MT order 702 was issued with one or more of: an invalid order, an incorrect state, and an invalid parameter, as further described herein in reference to the process 700 of FIG. 7.

If the multithreading facility is not installed at block 704 or the CPU is not enabled in a valid architecture mode 708, then the set-MT order is not accepted and an invalid order indication may be returned at blocks 706 or 710 respectively. If the other CPUs in the configuration are not in the stopped or check-stop state at block 712, or if the configuration is already enabled for multithreading at block 716, the set-MT order is not accepted and an incorrect state indication may be returned at block 714 or 718 respectively.

If the PSMTID is invalid at block 720, then the set-MT order is not accepted and an invalid parameter indication may be returned at block 722. When the PSMTID is zero at block 724, the configuration is not enabled for multithreading, remains in ST mode, and provides any status as a condition code at block 728. In an exemplary embodiment, when the PSMTID is valid and nonzero, at block 726, the configuration is enabled for multithreading, resulting in CPU-address expansion, the ALBs and TLBs of all CPUs in the configuration are cleared of their contents, and a serialization and checkpoint-synchronization function is performed on all CPUs in the configuration. Status can be provided at block 728 in a condition code. Upon successful completion, all CPUs other than the CPU executing the set-MT order remain in the stopped or check-stop state. However, if a CPU was in the check-stop state before multithreading is enabled, it may be unpredictable whether the CPUs having nonzero thread IDs in the same core are placed in the stopped or check-stopped state.

A thread context may also be referred to as an architected register context. The architected register context (that is, the contents of the PSW, CPU timer, clock comparator, general registers, floating-point registers and floating-point control register, vector registers, control registers, access registers, prefix register, and TOD-programmable register, etc.) of each CPU before multithreading is enabled becomes the architected register context of the CPU having TID zero of each respective core after multithreading is enabled. Similarly, the architected register context of the CPU having TID zero of each core of an MT-enabled configuration becomes the architected register context of each respective CPU when multithreading is disabled as a result of the activation of a load-normal or load-with-dump key.

The architected register context of all CPUs having a non-zero thread identification can be retained when the multithreading facility is disabled as a result of the activation of a load-normal or load-with-dump key operation. If the multithreading facility is subsequently re-enabled without an intervening clear reset, the architected register context of all CPUs having a nonzero thread identification are restored.

When multithreading is re-enabled after having been disabled by the activation of the load-normal or load-with-dump key, if the value of the PSMTID in bits of the parameter register differs from that used in the preceding enablement, then the architected register context of all CPUs having non-zero thread IDs can be unpredictable.

A store system information instruction can be used to store information about a component or components of a configuration into a system-information block (SYSIB). The SYSIB can include an MT installed field, an MT general field, a total CPU/core count, a configured CPU/core count, a standby CPU/core count, a reserved CPU/core count, and other fields. The MT installed field can indicate whether the multithreading facility is installed and may also indicate the highest supported TID for a first core type, e.g., a specialty core type. The MT general field can indicate the highest supported TID for a second core type, e.g., a general core type. The highest supported TID in the MT general field may be limited to being less than or equal to the highest supported TID in the MT installed field. The total CPU/core count may indicate a total number of general CPUs or cores comprising general CPUs in the configuration, whether in the configured, standby, or reserved state. The configured CPU/core count can indicate a number of general CPUs or cores comprising general CPUs in the configured state, i.e., in the configuration and ready to execute programs. The standby CPU/core count indicates a number of general CPUs or cores comprising general CPUs in the standby state, i.e., not available to be used to execute programs until placed in the configured state. The reserved CPU/core count indicates a number of general CPUs or cores comprising general CPUs in the reserved state, i.e., unavailable to be used to execute programs and unable to be placed in the configured state.

Figure 8:
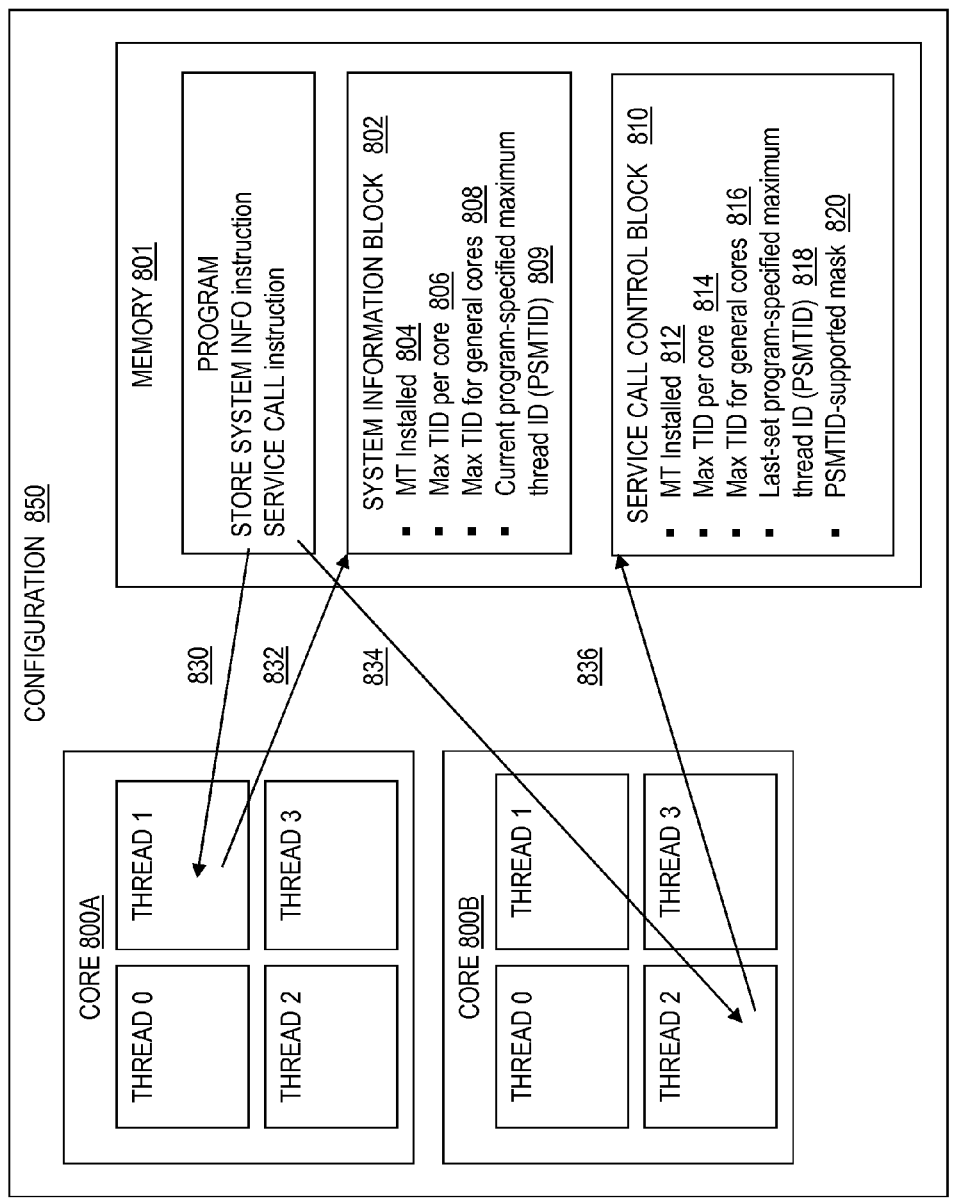
FIG. 8 depicts an example of storing multithreading capability information in accordance with an embodiment.

FIG. 8 depicts an example of storing multithreading capability information in accordance with an embodiment. A program executing in a thread, such as thread1 of core 800A, may fetch a STORE SYSTEM INFORMATION (STSI) instruction 830 from memory 801 of a configuration 850 such as an LPAR. The execution of the STSI instruction may result in the storing 832 of a system information block (SYSIB) 802. In the example of FIG. 8, the SYSIB 802 includes an MT installed identifier 804 indicating whether the configuration 850 supports multithreading. The SYSIB 802 also includes a maximum thread identifier of a highest supported thread of a core 800A/800B that can be provided as a maximum TID per core 806 for specialty cores and a maximum TID for general cores 808. The SYSIB 802 may also include a current program-specified maximum thread identifier (PSMTID) 809. The current PSMTID 809 reflects a multithreading mode as enabled in configuration 850 by the program. The current PSMTID 809 may not be defined if the STSI instruction 830 is executed at a basic-machine level.

A program executing in a thread, such as thread2 of a core 800B, may also fetch a SERVICE CALL (SERVC) instruction 834 from memory 801 of the configuration 850, where the instruction specifies a read-system-control-program-information (read-SCP-info, or RSCPI) command. The execution of the RSCPI command may cause a service-call control block (SCCB) 810 to be stored 836 in the memory 801. In an exemplary embodiment, the SCCB 810 stored by the execution of the RSCPI command provides similar and additional information that may not be available in the SYSIB 802. In the example of FIG. 8, the SCCB 810 includes an MT installed identifier 812 indicating whether the core 800B supports multithreading. The SCCB 810 also includes a maximum thread identifier of a highest supported thread of the core 800B that can be provided as a maximum TID per core 814 for specialty cores and a maximum TID for general cores 816. The values of 812-816 of the SCCB 810 are equivalent to the values 804-808 that may be accessible in the SYSIB 802. Additionally, the SCCB 810 can include a last-set program-specified maximum thread identifier of a highest supported thread of the core 800B, which is also referred to the as a last-set program-specified maximum thread identifier (PSMTID) 818. The SCCB 810 can also include a mask of PSMTID values acceptable on the set-MT order as a PSMTID supported mask 820. The PSMTID supported mask 820 can be used to identify supported CPUs/threads when fewer than the number defined by the max TID per core 814 are desired.

It will be understood that the cores 800A and 800B include other aspects that are not depicted in this example. Furthermore, the SYSIB 802 and the SCCB 810 can include additional values beyond those depicted in the example of FIG. 8.

Figure 9:
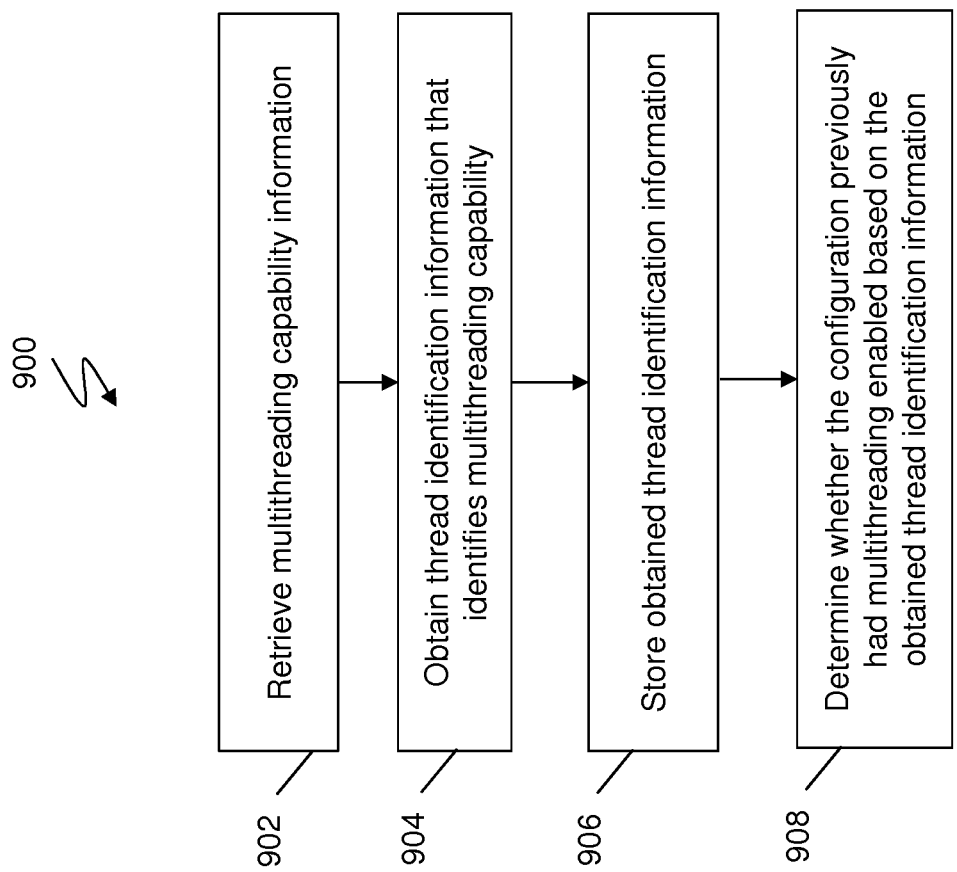
FIG. 9 depicts a process flow for determining multithreading capability in accordance with an embodiment.

FIG. 9 depicts a process flow 900 for determining multithreading capability in accordance with an embodiment. At block 902, the core executes a retrieve multithreading capability information (RMTCI) instruction, which can be, for instance, any one of a SERVC instruction or a STSI instruction. At block 904, thread identification information is obtained that identifies a multithreading capability of a configuration. At block 906, the obtained thread identification information is stored. At block 908, it is determined whether the configuration previously had multithreading enabled based on the obtained thread identification information.

As previously described, the SERVC instruction is configured to store thread identification information in a response block in memory (e.g., SCCB 810 of FIG. 8), and the STSI instruction is configured to store the thread identification information in a SYSIB in memory (e.g., SYSIB 802 of FIG. 8). The obtained thread information can include an MT installed identifier (e.g., MT installed identifier 804 or 812 of FIG. 8) indicating whether the core supports multithreading. The obtained thread information may also include a maximum thread identifier of a highest supported thread of the core (e.g., maximum TID values 806, 808, 814, or 816 of FIG. 8). The obtained thread information can include a current program-specified maximum thread identifier (e.g., current PSMTID 809 of FIG. 8) and a last-set program-specified maximum thread identifier (e.g., PSMTID 818 of FIG. 8). The response block can include a mask of bits indicating specific thread identifiers that are individually supported (e.g., PSMTID supported mask 820 of FIG. 8). The determination that the configuration previously had MT enabled may be based on a non-zero value in the last-set program-specified maximum thread identifier (e.g., last-set PSMTID>0). In an exemplary embodiment, the configuration supports a plurality of core types.

In exemplary embodiments, registers and values such as program counter values, which may be included in the registers or managed separately, are captured as thread context. When address expansion occurs in MT mode, additional thread context becomes accessible. As previously described in reference to FIG. 6, a CPU address is formed for each core in a configuration. The CPU address may be inspected by the store CPU address instruction, it appears in other structures, and it is used in various SIGP orders. When MT is not enabled, this addressing scheme remains unchanged. When MT is enabled, the CPU address undergoes an expansion process. As previously described, the non-MT-enabled portion of the CPU address can be shifted left sufficient bits to accommodate the TID. For example, if an operating system issued the SIGP set-MT order with a PSMTID value 1, the CPU address would be shifted left by 1 bit; if PSMTID was 2 or 3, the CPU address would be shifted left by 2 bits, if PSMTID is 4-7, the CPU address would be shifted left by 3 bits, and so forth.

Figure 10:
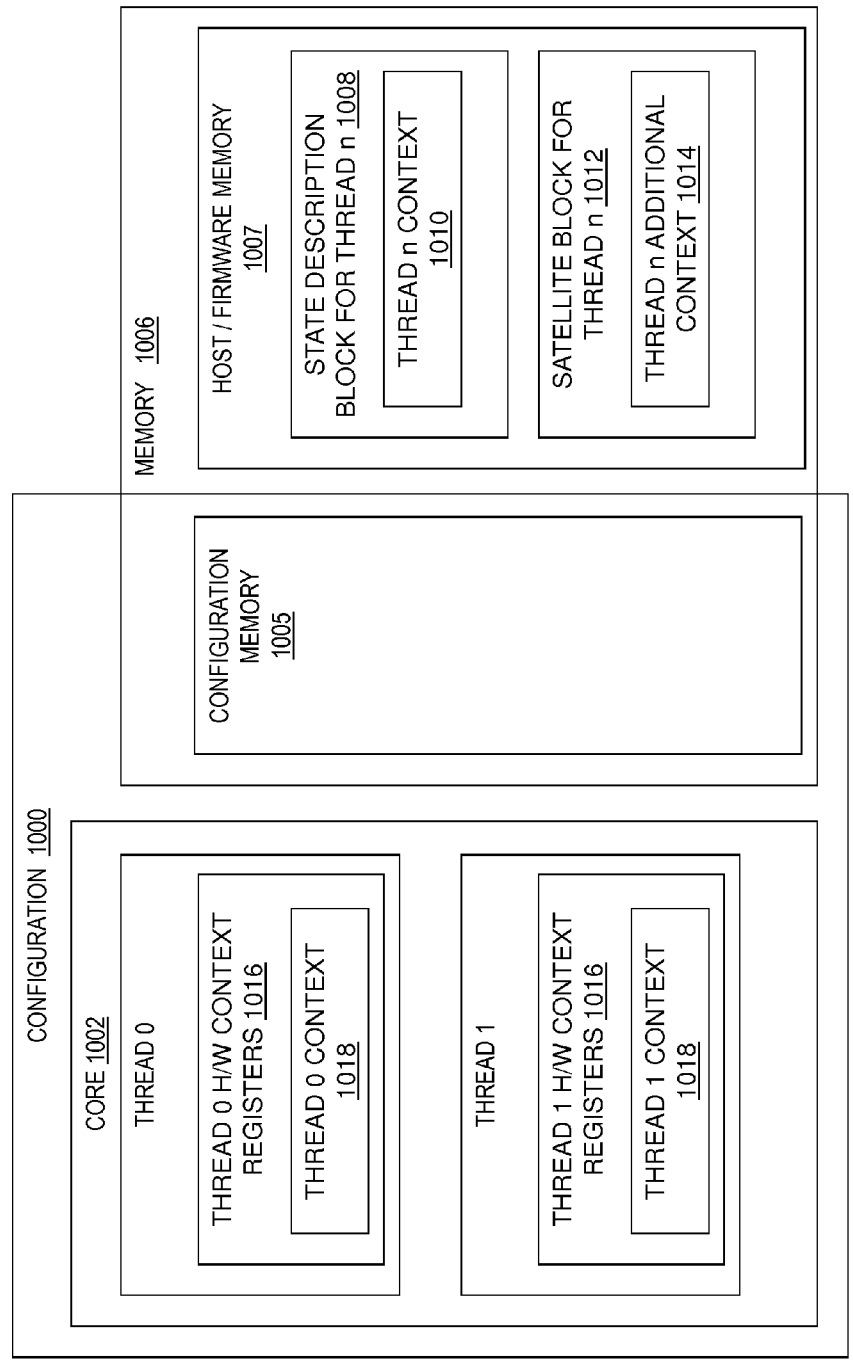
FIG. 10 depicts an example of various thread context locations in accordance with an embodiment.

When multithreading is subsequently disabled (as a result of a clear reset or CPU reset caused by a load-normal operation), CPU address contraction occurs. The MT-enabled CPU address can be shifted right by the same number of PSMTID bits used in the SIGP set-MT order that enabled MT, and the thread-ID portion of the address disappears. The thread context that is accessible during MT mode can reside in one or more locations, such as the example depicted in FIG. 10. In the example of FIG. 10, a configuration 1000 includes core 1002 and may include other cores (not depicted). Memory 1006 can include configuration memory 1005 as part of the configuration 1000 and host/firmware memory 1007 that is separate from the configuration 1000. The host/firmware memory 1007 can include a state-description block 1008 maintained by a host, which may store a thread context 1010 for a thread (e.g., thread n in FIG. 10). A satellite block 1012 may be anchored to the state-description block 1008 in the memory 1006 as part of the host/firmware memory 1007, where the satellite block 1012 can include thread context 1014 as an alternative to the thread context 1010 or in combination with the thread context 1010. Each thread may have a corresponding state-description block 1008 and optionally a satellite block 1012, where thread context 1010 or thread context 1014 can be stored. As a further alternative, hardware context registers 1016 can be used to store a thread context 1018, for instance, in core 1002. The examples of thread context 1010, 1014, and 1018 can be used in combination or separately as storage options. Alternate storage options can be employed in embodiments. Regardless of where thread context is maintained, upon address contraction, the thread context may no longer be directly accessible, but can be preserved for access by a dump program.

When MT is disabled, the CPU-address-contraction process makes threads 1-$n$ of a core no longer addressable; similarly, the thread context including architected registers is no longer visible to a program. If MT was disabled as a result of a CPU reset resulting from a non-clearing load operation, the register context of threads 1-$n$ is retained; these data may subsequently be inspected if the configuration is returned to the MT mode. Register context for each guest thread can be maintained by a host in the thread's state-description block 1008 (or as in the case of vector registers, in a satellite block 1012 anchored in the state description) as depicted in FIG. 10.

Retention of the context of threads 1-$n$ during the disablement of MT is a diagnostic feature for the state of the threads to be dumped following an OS failure. Following an OS failure, an operator may choose to run a stand-alone-dump (SADMP) program to capture the memory and thread context of the system at the time of the failure. However, loading the SADMP program can cause the configuration to revert to a default architectural mode with ST mode enabled, thus MT is disabled. But, because SADMP is loaded by a non-clearing load operation, the register context of threads 1-$n$ of each core is retained. SADMP can determine whether MT was enabled in the configuration being dumped by examining the results of a SERVC read-SCP-information command's response block. This number can subsequently be used as input to the SIGP set-MT order to re-enable MT at the same level as before.

Figure 11:
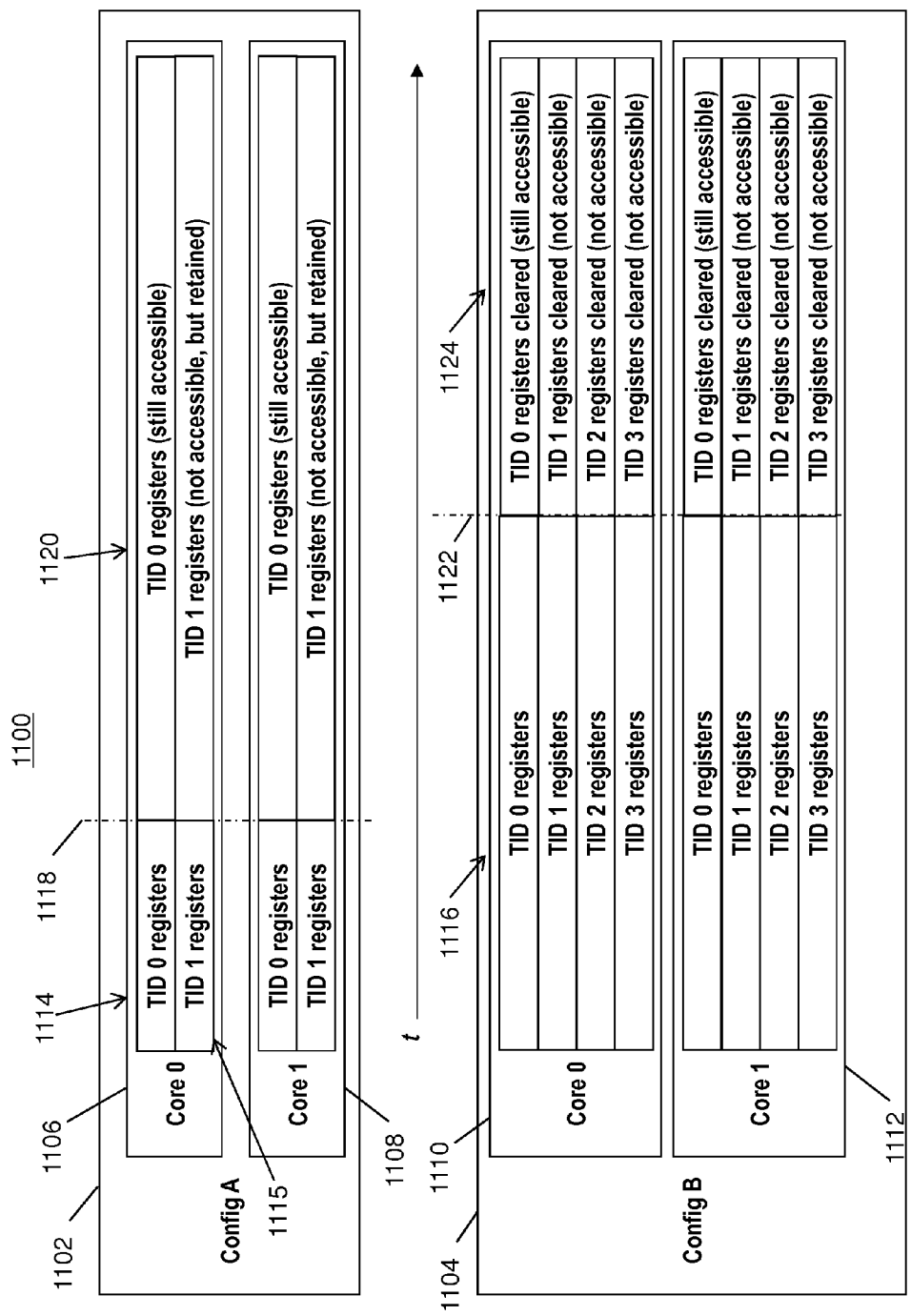
FIG. 11 depicts an example of multithreading register preservation in accordance with an embodiment.

FIG. 11 depicts an example of multithreading register preservation in accordance with an embodiment. A system, such as a computer system 1100 of FIG. 11, may include multiple configurations 1102 and 1104. In the example of FIG. 11, configuration 1102 includes core 1106 and core 1108, and configuration 1104 includes core 1110 and core 1112. Each of the configurations 1102 and 1104 can independently be switched between ST and MT modes at different times. Each of the configurations 1102 and 1104 of the computer system 1100 is configurable with a different number of maximum thread-IDs to support a simultaneously enabled different number of threads at each of the configurations 1102 and 1104. In the example of FIG. 11, cores 1106 and 1108 each support a maximum of two threads while configuration 1102 is in MT mode 1114, whereas cores 1110 and 1112 each support a maximum of four threads while configuration 1104 is in MT mode 1116.

While MT mode 1114 is enabled in configuration 1102, both TID 0 and TID 1 are accessible as separate thread contexts, such as separate instances of thread context 1115. At time 1118, the MT mode 1114 may be disabled by a load-normal operation or a non-clearing reset for the configuration 1102, which switches both cores 1106 and 1108 into ST mode 1120. Due to address contraction as previously described, TID0 registers are accessible in ST mode 1120; however, TID1 registers that were accessible in the MT mode 1114 are retained but no longer accessible. For example, the TID1 registers may be embodied as thread context 1010, 1014, or 1018 of FIG. 10, where an address that was available with address expansion is no longer accessible after address contraction upon switching to ST mode 1120.

While configuration 1104 has MT mode 1116 enabled, TID0, TID1, TID2, and TID3 registers are accessible as separate thread context, such as separate instances of thread context 1010, 1014, or 1018 of FIG. 10. In this example, TID0 represents a primary thread and TID1-TID3 represent secondary threads that are separately maintained for each of the cores 1110 and 1112. At time 1122, the MT mode 1116 may be disabled by a clearing reset for the configuration 1104, which switches both cores 1110 and 1112 into ST mode 1124. The clearing reset at time 1122 can clear all of the registers of TID0, TID1, TID2, and TID3. Due to address contraction as previously described, TID0 registers are accessible in ST mode 1124; however, TID1, TID2, and TID3 registers that were accessible in the MT mode 1116 are retained in a cleared state but no longer accessible. As depicted in FIG. 11, operations can be independently performed on each configuration 1102 and 1104 at different times 1118 and 1122 with the effects localized to each configuration 1102 and 1104. Thus, configuration 1102 can be in ST mode 1120 while configuration 1104 is in MT mode 1116, and the ST/MT modes need not be aligned for all configurations of the computer system 1100.

Figure 12:
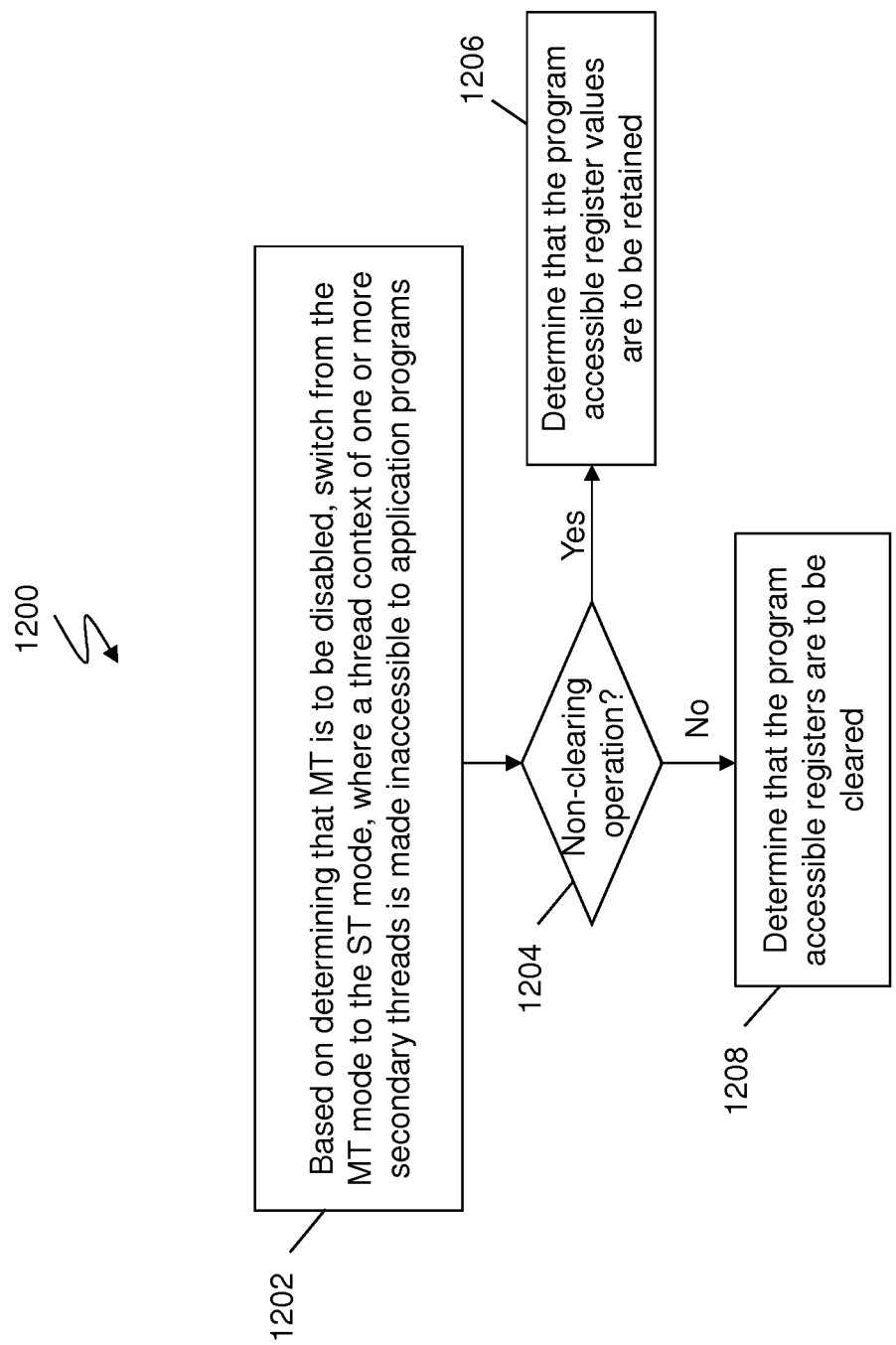
FIG. 12 depicts a process flow for multithreading register preservation in accordance with an embodiment.

FIG. 12 depicts a process flow 1200 for multithreading register preservation in accordance with an embodiment. At block 1202, based on determining by a core in the MT mode, that MT is to be disabled in the core, switching from the MT mode to the ST mode is performed. The primary thread of the MT mode can be maintained as the only thread of the ST mode. One or more thread contexts that include program accessible register values and program counter values of secondary threads are made inaccessible to application programs. At block 1204, based on the switching, an operation type (e.g., clearing vs. non-clearing) is determined to either clear the program accessible register values or retain the program accessible register values is performed. At block 1206, based on a non-clearing operation, it is determined that the program accessible register values are to be retained. At block 1208, based on a clearing operation, it is determined that the program accessible registers are to be cleared.

As previously described, the program accessible register values and program counter values of thread context can include program general purpose registers, floating-point registers, control registers, access registers, a prefix register, and TOD programmable registers. The control registers can include a floating-point control register, runtime-instrumentation controls, CPU-measurement controls, and the like. Other examples of registers that can be included in the thread context include a program-status word (e.g., including a program counter/instruction address, condition code, and other information to control instruction sequencing and to determine CPU state), vector registers, a CPU timer, a clock comparator, a breaking-event address register, and other registers known in the art. As previously described, the PSMTID is set based on a last successfully executed signal processor instruction that caused MT to be enabled. Based on switching to the MT mode, the program accessible register values are made accessible to application programs based on corresponding secondary threads being re-enabled. For example, switching from ST mode 1120 back to MT mode 1114 in FIG. 11 allows TID1 registers to be accessed, and TID1 may be re-enabled. Thread context can be maintained in any of: a state-description block, a satellite block anchored to the state-description block in memory, or a context register, such as thread context 1010, 1014, or 1018 of FIG. 10.

A primary thread context can include program accessible register values and program counter values of a primary thread, e.g. TID0 and TID0 registers for configuration 1104 of FIG. 11, where the primary thread context is accessible to application programs in both the ST mode 1124 and the MT mode 1116. A secondary thread context can include program accessible register values and program counter values of a secondary thread, e.g. TID1-TID3 and TID1-TID3 registers for configuration 1104 of FIG. 11.

Figure 13:
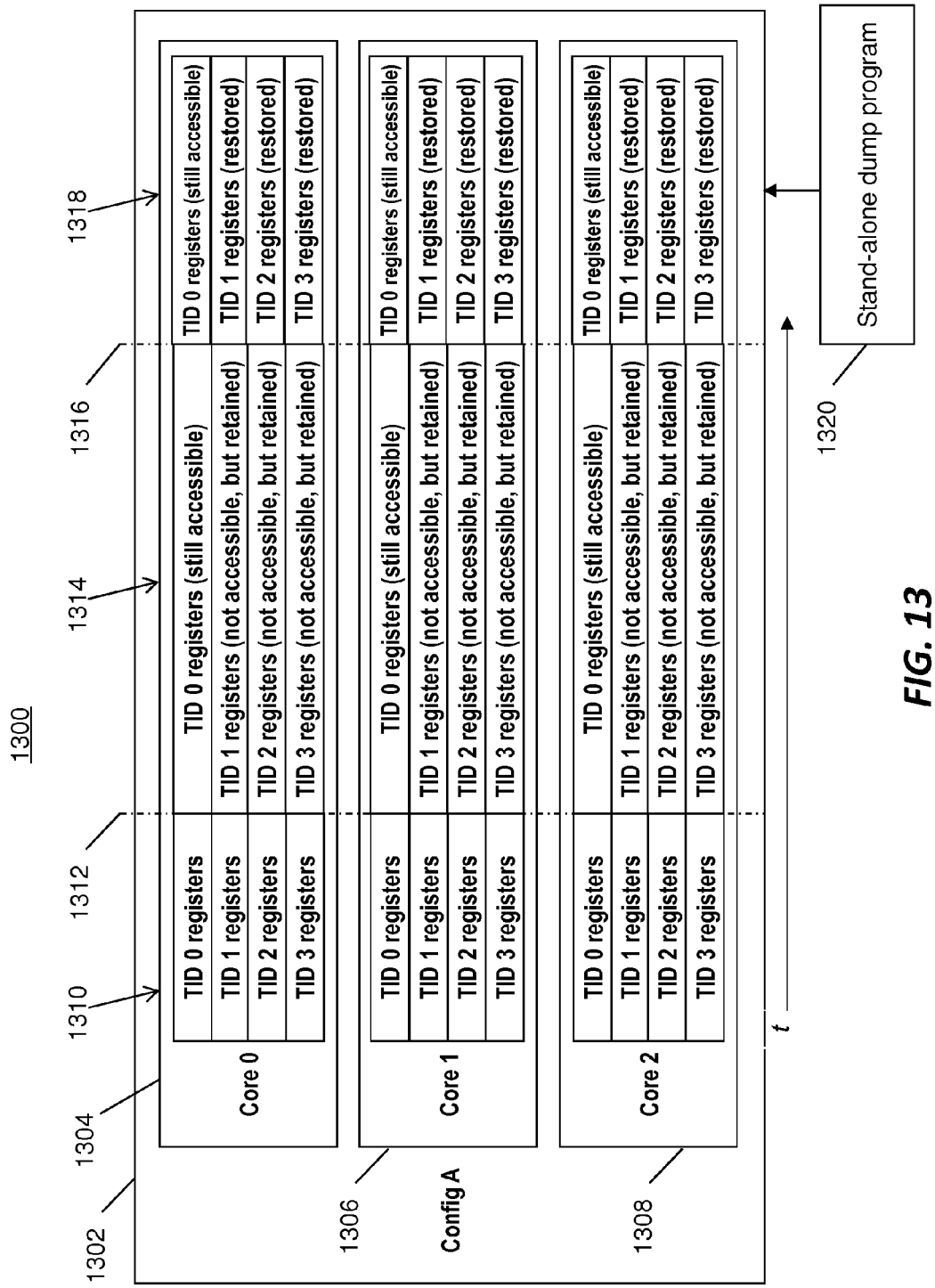
FIG. 13 depicts an example of multithreading register restoration in accordance with an embodiment.

FIG. 13 depicts an example of multithreading register restoration in accordance with an embodiment. The example of FIG. 13 includes a computer system 1300 with a single configuration 1302. The configuration 1302 includes core 1304, core 1306, and core 1308. Each of the cores 1304-1308 includes a maximum of four threads (TID0, TID1, TID2, and TID3) in this example. In MT mode 1310, all of thread context of TID0-TID3 is available in cores 1304-1308. At time 1312, the MT mode 1310 may be disabled by a load-normal operation or a non-clearing reset of the configuration 1302, which switches cores 1304-1308 into ST mode 1314. In ST mode 1314, TID0 registers remain accessible, and TID1-TID3 registers are inaccessible but are retained for each of the cores 1304-1308. At time 1316, MT can be re-enabled by execution of a SIGP set-MT order to enter a resumed MT mode 1318. In the resumed MT mode 1318, access to thread context of TID1-TID3 registers for each of the cores 1304-1308 is restored. This enables inspection of all of the thread's registers, including the TID1-TID3 registers, by a dump program, such as stand-alone dump program 1320, to save thread context information for analysis.

Figure 14:
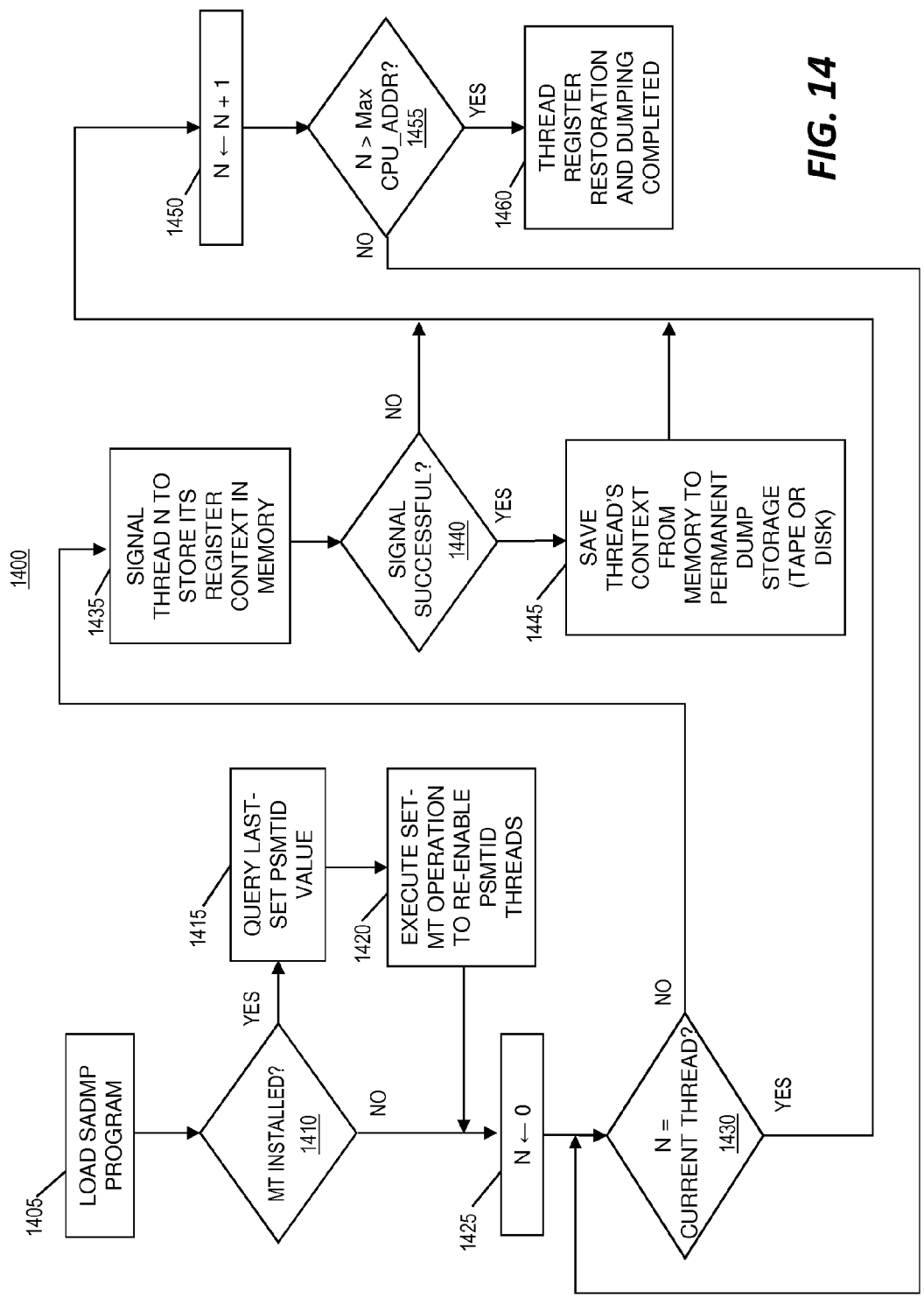
FIG. 14 depicts a process flow for multithreading register restoration in accordance with an embodiment.

FIG. 14 depicts a process flow 1400 for multithreading register restoration in accordance with an embodiment as may be employed by a stand-alone dumping (SADMP) program, such as stand-alone dump program 1320 of FIG. 13, to capture the architected register context of threads following the failure of an operating system. At block 1405, a SADMP program is loaded via a non-clearing load operation (e.g., load normal or load-with-dump). The non-clearing load operation implicitly causes the configuration to revert to the ST mode, such as ST mode 1314 for configuration 1302 of FIG. 13. The SADMP program can then query whether the MT facility is available in the configuration at block 1410 by using the STSI or SERVC instruction. If MT is installed, the SADMP program queries the last-set program-specified maximum thread identification (PSMTID) set for the configuration at block 1415. If MT had never previously been set for the configuration, the last-set PSMTID value will be zero. The SADMP program can then execute the instruction to re-enable multithreading at block 1420 at whatever the last-set PSMTID was (even if it was zero). If the query at block 1410 reveals that MT is not installed, then no attempt is made to query the last-set PSMTID value at block 1415 or re-enable MT at block 1420.

The SADMP program attempts to signal each other CPU (thread) in the configuration to save its architected register context in a predefined location in memory. If MT was not previously enabled prior to loading SADMP, the CPU addresses are the normal, non-expanded format. If MT was previously enabled, the CPU addresses are the expanded format including a core ID and thread ID. SADMP begins with a CPU address (N) of zero at block 1425, and determines whether that CPU address represents the CPU upon which SADMP is executing at block 1430. If so, that CPU/thread is skipped, and N is incremented to the next value at block 1450. If N differs from the current CPU address, then that CPU/thread is signaled to store its architected register context in memory, for example, by the execution of either a SIGP store-status-at-address order or a SIGP stop-and-store-status order at block 1435. If the configuration includes a vector facility, a SIGP store-additional-status-at-address order may also be executed to store the contents of the CPU/thread's vector registers. A determination is made as to whether the signal of block 1435 was successful at block 1440. If successful, the SADMP program may save the CPU/thread's register context in a dump file on tape or disk at block 1445, and processing continues by incrementing N at block 1450. If the signal of block 1435 is not successful (for example, if the thread is not operational) as determined by block 1440, then it is skipped, and processing continues by incrementing N at block 1450. The value of the CPU address used in signaling (N) is incremented at block 1450, and a determination is made as to whether N is now greater than the highest-possible CPU address for the configuration at block 1455. If N is not greater than the highest-possible CPU address for the configuration, then processing continues by determining whether N represents the current CPU/thread under which the SADMP program is executing at block 1430. If N is greater than the highest-possible CPU address for the configuration, then the architected register context restoration and dumping has completed at block 1460.

Although FIG. 14 is described with respect to one core of a configuration, it will be understood that the process flow 1400 of FIG. 14 can be extended to run through the maximum CPU address across all cores of a configuration that includes multiple cores. Additional accommodations can be made in configurations to support dumping for an OS that does not support MT or a program that is MT-aware but does not exploit MT. For example, a clearing reset can be performed prior to loading an OS that does not support MT in the configuration to prevent an MT-aware stand-alone dump program from attempting to dump any secondary threads from the configuration. As another example, a program that is MT-aware but does not exploit MT, can issue a set-MT order with a corresponding maximum thread-id of zero prior to executing a stand-alone dump program for the configuration.

Technical effects and benefits include providing dynamic enablement of multithreading in a computer system that supports both a single thread mode and a multithreading mode of operation.

The system described herein enables software to mitigate hardware variability by requiring an OS to explicitly "opt in" to exploit the MT hardware. When the OS understands the MT nature of the execution environment, the OS has the ability to explicitly manage the per-core thread densities (to the best of its ability, given a workload dispatch pattern). The OS has the option to maintain high thread densities even when compute resources are less utilized, thereby mitigating much of the variability in total compute capacity that is seen on other MT implementations. As a direct result of maintaining high thread densities, both the transaction response times and billing aspects may be more consistent.

Embodiments include a system, method, and computer program product for dynamic enablement of multithreading. According to one aspect, a computer system includes a configuration with a core configurable between a single thread (ST) mode and a multithreading (MT) mode. The ST mode addresses a primary thread, and the MT mode addresses the primary thread and one or more secondary threads on shared resources of the core. The computer system also includes a multithreading facility configured to control the configuration to perform a method. The method includes executing in the primary thread in the ST mode, an MT mode setting instruction. A number of threads requested is obtained from a location specified by the MT mode setting instruction. Based on determining that the number of threads requested indicates multiple threads, the MT mode is enabled to execute the multiple threads including the primary thread and the one or more secondary threads.

According to another aspect, a computer-implemented method for dynamic enablement of multithreading in a configuration is provided. The configuration includes a core configurable between an ST mode and an MT mode, where the ST mode addresses a primary thread and the MT mode addresses the primary thread and one or more secondary threads on shared resources of the core. The method includes executing in the primary thread in the ST mode, an MT mode setting instruction. A number of threads requested is obtained from a location specified by the MT mode setting instruction. Based on determining that the number of threads requested indicates multiple threads, the MT mode is enabled to execute the multiple threads including the primary thread and the one or more secondary threads.

A further aspect includes a computer program product for implementing dynamic enablement of multithreading in a configuration. The configuration includes a core configurable between an ST mode and an MT mode, where the ST mode addresses a primary thread and the MT mode addresses the primary thread and one or more secondary threads on shared resources of the core. The computer program product includes a computer readable storage medium having program instructions embodied therewith, where the computer readable storage medium is not a signal. The program instructions are readable by a processing circuit to cause the processing circuit to perform a method. The method includes executing in the primary thread in the ST mode on the core of the configuration, an MT mode setting instruction. A number of threads requested is obtained from a location specified by the MT mode setting instruction. Based on determining that the number of threads requested indicates multiple threads, the MT mode is enabled to execute the multiple threads including the primary thread and one or more secondary threads.

In addition to one or more of the features described above, or as an alternative, further embodiments can include where the MT mode setting instruction is a signal processor (SIGP) instruction that can be issued from an operating system. The SIGP instruction can include a set-MT order and a program specified maximum thread-id (PSMTID) associated with the number of threads requested.

In addition to one or more of the features described above, or as an alternative, further embodiments can include enabling the MT mode based on executing the set-MT order with a non-zero value of the PSMTID, and remaining in the ST mode and preventing enablement of the MT mode based on executing the set-MT order with a zero value of the PSMTID.

In addition to one or more of the features described above, or as an alternative, further embodiments can include where an error indication is provided and enablement of the MT mode is prevented based on determining that the set-MT order was issued with one or more of: an invalid order, an incorrect state, and an invalid parameter.

In addition to one or more of the features described above, or as an alternative, further embodiments can include where the MT mode is disabled based on a reset or a deactivation of the configuration, and one or more secondary thread contexts and a last-set PSMTID are retained for a non-clearing reset or zeroed for a clearing reset.

In addition to one or more of the features described above, or as an alternative, further embodiments can include where the configuration defaults to the ST mode upon the reset or the deactivation or activation of the configuration.

In addition to one or more of the features described above, or as an alternative, further embodiments can include where an executing program is provided with an indication of a maximum thread-id based on a response to a service call (SERVC) instruction or a store system information (STSI) instruction.

In addition to one or more of the features described above, or as an alternative, further embodiments can include a plurality of configurations, where each of the configurations of the computer system is configurable with a different number of maximum thread-ids to support a simultaneously enabled different number of threads at each of the configurations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 15:
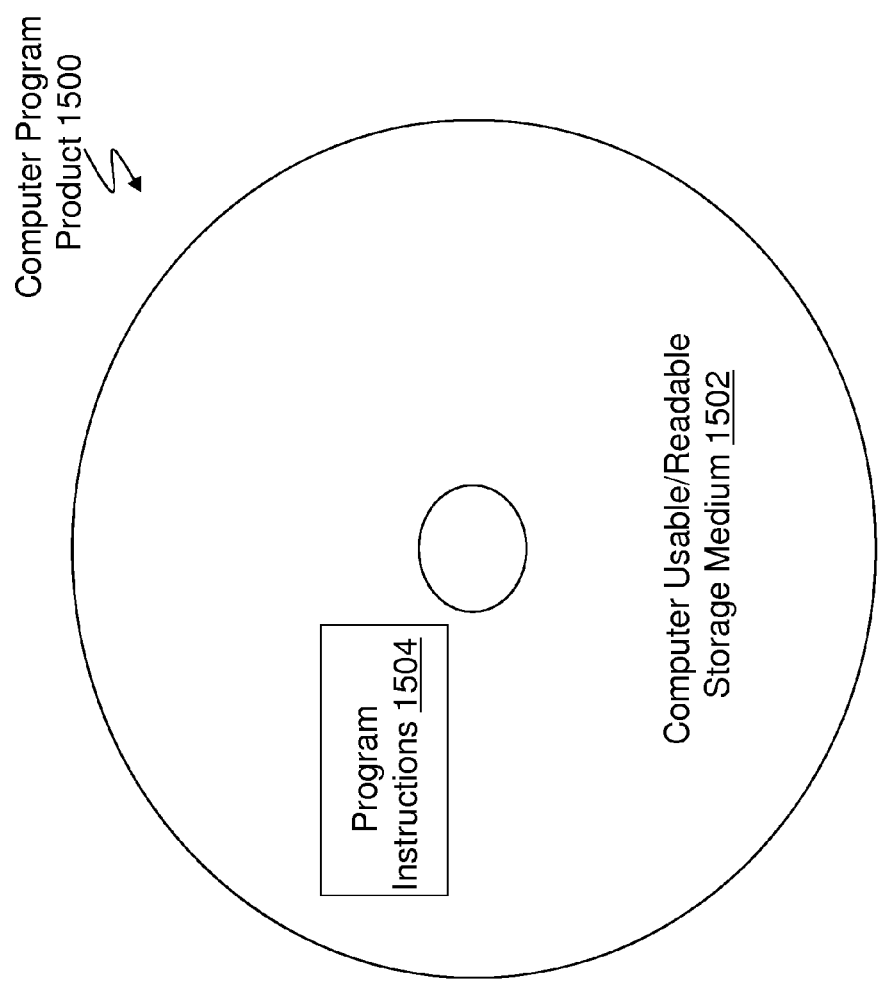
FIG. 15 depicts a computer-readable medium according to an embodiment.

Referring now to FIG. 15, a computer program product 1500 in accordance with an embodiment that includes a computer readable storage medium 1502 and program instructions 1504 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
    a configuration comprising a core configurable between a single thread (ST) mode and a multithreading (MT) mode, the ST mode addressing a primary thread and the MT mode addressing the primary thread and one or more secondary threads on shared resources of the core; and
    a multithreading facility configured to control the configuration to perform a method comprising:
        executing in the primary thread in the ST mode, an MT mode setting instruction;
        obtaining a number of threads requested from a location specified by the MT mode setting instruction; and
        based on determining that the number of threads requested indicates multiple threads, enabling the MT mode to execute the multiple threads comprising the primary thread and the one or more secondary threads.

2. The computer system according to claim 1, wherein the MT mode setting instruction is a signal processor (SIGP) instruction from an operating system, the SIGP instruction comprising a set-MT order and a program specified maximum thread-id (PSMTID) associated with the number of threads requested.

3. The computer system according to claim 2, further comprising:
    enabling the MT mode based on executing the set-MT order with a non-zero value of the PSMTID; and
    remaining in the ST mode and preventing enablement of the MT mode based on executing the set-MT order with a zero value of the PSMTID.

4. The computer system according to claim 3, wherein an error indication is provided and enablement of the MT mode is prevented based on determining that the set-MT order was issued with one or more of: an invalid order, an incorrect state, and an invalid parameter.

5. The computer system according to claim 2, wherein the MT mode is disabled based on a reset or a deactivation of the configuration, and one or more secondary thread contexts and a last-set PSMTID are retained for a non-clearing reset or zeroed for a clearing reset.

6. The computer system according to claim 5, wherein the configuration defaults to the ST mode upon the reset or the deactivation or activation of the configuration.

7. The computer system according to claim 1, wherein an executing program is provided with an indication of a maximum thread-id based on a response to a service call (SERVC) instruction or a store system information (STSI) instruction.

8. The computer system according to claim 1, further comprising a plurality of configurations, wherein each of the configurations of the computer system is configurable with a different number of maximum thread-ids to support a simultaneously enabled different number of threads at each of the configurations.

9. A computer program product for implementing dynamic enablement of multithreading in a configuration comprising a core configurable between a single thread (ST) mode and a multithreading (MT) mode, the ST mode addressing a primary thread and the MT mode addressing the primary thread and one or more secondary threads on shared resources of the core, the computer program product comprising:
   a computer readable storage medium having program instructions embodied therewith, wherein the computer readable storage medium is not a signal, the program instructions readable by a processing circuit to cause the processing circuit to perform a method comprising:
   executing in the primary thread in the ST mode on the core of the configuration, an MT mode setting instruction;
   obtaining a number of threads requested from a location specified by the MT mode setting instruction; and
   based on determining that the number of threads requested indicates multiple threads, enabling the MT mode to execute the multiple threads comprising the primary thread and the one or more secondary threads.

10. The computer program product according to claim 9, wherein the MT mode setting instruction is a signal processor (SIGP) instruction from an operating system, the SIGP instruction comprising a set-MT order and a program specified maximum thread-id (PSMTID) associated with the number of threads requested.

11. The computer program product according to claim 10, further comprising:
   enabling the MT mode based on executing the set-MT order with a non-zero value of the PSMTID; and
   remaining in the ST mode and preventing enablement of the MT mode based on executing the set-MT order with a zero value of the PSMTID.

12. The computer program product according to claim 11, wherein an error indication is provided and enablement of the MT mode is prevented based on determining that the set-MT order was issued with one or more of: an invalid order, an incorrect state, and an invalid parameter.

13. The computer program product according to claim 10, wherein the MT mode is disabled based on a reset or a deactivation of the configuration, and one or more secondary thread contexts and a last-set PSMTID are retained for a non-clearing reset or zeroed for a clearing reset.

* * * * *